(12) United States Patent
Lah et al.

(10) Patent No.: US 10,683,941 B2
(45) Date of Patent: Jun. 16, 2020

(54) BLACK-POWDER-RESISTANT THROUGH CONDUIT VALVE

(71) Applicant: DeltaValve, LLC, Sandy, UT (US)

(72) Inventors: Ruben F. Lah, South Jordan, UT (US); Filiberto R. Jimenez, South Jordan, UT (US); Gary Larsen, West Jordan, UT (US)

(*) Notice: Subject to any disclaimer, the term of this patent is extended or adjusted under 35 U.S.C. 154(b) by 0 days.

(21) Appl. No.: 16/045,451

(22) Filed: Jul. 25, 2018

(65) Prior Publication Data

US 2019/0032793 A1 Jan. 31, 2019

Related U.S. Application Data

(60) Provisional application No. 62/537,451, filed on Jul. 26, 2017.

(51) Int. Cl.
| | |
|---|---|
| *F16K 3/02* | (2006.01) |
| *F16K 3/20* | (2006.01) |
| *E21B 34/00* | (2006.01) |
| *F16K 3/30* | (2006.01) |

(52) U.S. Cl.
CPC ............ *F16K 3/0227* (2013.01); *E21B 34/00* (2013.01); *F16K 3/0236* (2013.01); *F16K 3/0272* (2013.01); *F16K 3/20* (2013.01); *F16K 3/30* (2013.01)

(58) Field of Classification Search
CPC ........ F16K 3/0227; F16K 3/30; F16K 3/0272; F16K 3/20; F16K 3/0236; E21B 34/00; E21B 34/02; E21B 34/04
USPC ................................ 251/326–329, 195, 1.3
See application file for complete search history.

(56) References Cited

U.S. PATENT DOCUMENTS

| | | | | |
|---|---|---|---|---|
| 3,348,567 A | * | 10/1967 | Volpin ...................... | F16K 3/36 137/246.12 |
| 3,508,573 A | * | 4/1970 | Smith ....................... | F16K 3/12 137/375 |
| 4,029,294 A | * | 6/1977 | McCaskill ................ | F16K 3/36 251/282 |
| 4,240,460 A | * | 12/1980 | Alaniz ..................... | F16K 3/186 137/327 |
| 4,483,511 A | * | 11/1984 | Kushida .................. | F16K 5/201 251/172 |

(Continued)

FOREIGN PATENT DOCUMENTS

WO    2017-100066 A1    6/2017

*Primary Examiner* — John Bastianelli
(74) *Attorney, Agent, or Firm* — Michael F. Krieger; Kirton McConkie

(57) ABSTRACT

A valve having improved resistance to black powder wear and damage includes a valve body defining a flow passage therethrough, an upper bonnet assembly defining a stem opening, and a stem passing through the stem opening. The valve also includes an elongate gate having a proximal end operatively attached to the stem, a distal end, an orifice sized and adapted to permit essentially unopposed passage of material through the gate when the orifice is aligned with the flow passage of the valve body, the orifice being located proximate the proximate end of the gate, and a solid portion sized and adapted to substantially completely block the flow of material through the gate when the solid portion is aligned with the flow passage of the valve body, the solid portion being located distally of the orifice such that the orifice is located between the proximal end and the solid portion.

10 Claims, 20 Drawing Sheets

(56) References Cited

U.S. PATENT DOCUMENTS

| | | | | |
|---|---|---|---|---|
| 4,625,942 A | * | 12/1986 | Nelson | F16K 3/0227 |
| | | | | 251/327 |
| 4,741,509 A | * | 5/1988 | Bunch | F16K 3/0236 |
| | | | | 251/172 |
| 4,878,651 A | * | 11/1989 | Meyer, Jr. | F16K 3/0236 |
| | | | | 251/172 |
| 4,934,652 A | * | 6/1990 | Golden | E21B 34/02 |
| | | | | 251/327 |
| 5,094,270 A | * | 3/1992 | Reimert | F16K 3/029 |
| | | | | 137/614.11 |
| 5,803,431 A | * | 9/1998 | Hoang | E21B 29/04 |
| | | | | 251/326 |
| 6,158,718 A | | 12/2000 | Lang et al. | |
| 8,689,886 B2 | * | 4/2014 | Wolfe | F16K 25/005 |
| | | | | 166/373 |
| 8,794,593 B2 | * | 8/2014 | Kahn | F16K 3/0227 |
| | | | | 251/195 |
| 9,388,342 B2 | * | 7/2016 | Orino | C10B 25/10 |
| 2006/0118750 A1 | | 6/2006 | Hunter et al. | |
| 2010/0044611 A1 | | 2/2010 | Comeaux et al. | |
| 2012/0256111 A1 | * | 10/2012 | Hoang | F16K 3/18 |
| | | | | 251/264 |
| 2013/0049931 A1 | | 2/2013 | Ryan | |

\* cited by examiner

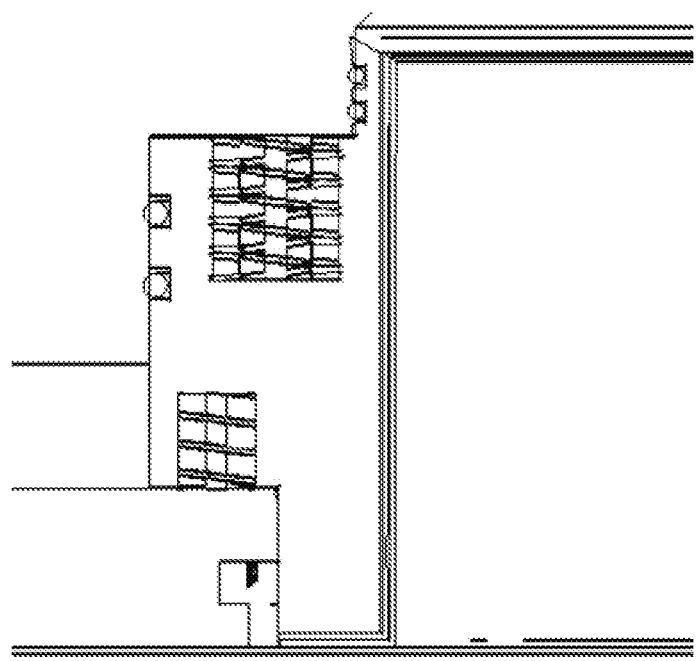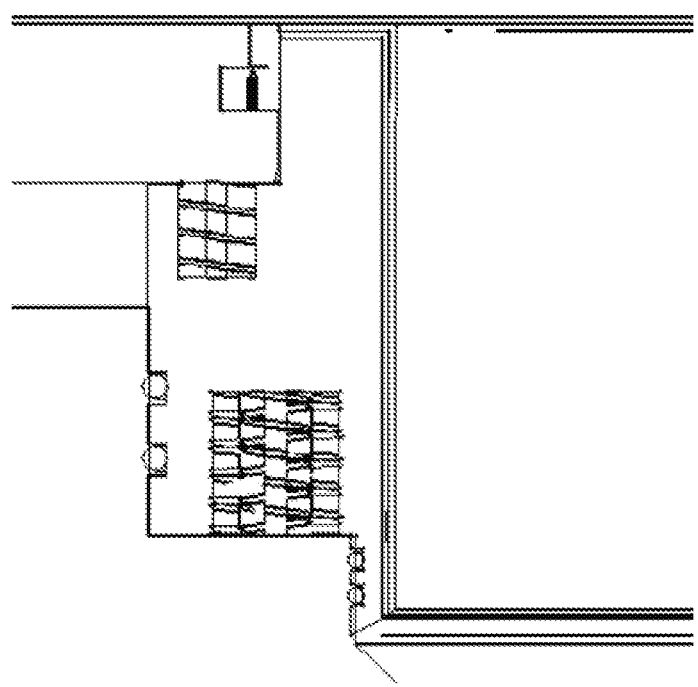
FIG. 10

BLACK-POWDER-RESISTANT THROUGH CONDUIT VALVE

CROSS-RELATED APPLICATIONS

The application claims priority to United States Provisional Patent Application No. 62/537,451 filed Jul. 26, 2017 entitled Black-Powder-Resistant Through Conduit Valve.

BACKGROUND OF THE INVENTION

1. Field of the Invention

The present invention relates to valves for the oil and gas industry, and more particularly to through conduit or other valves that are resistant to black powder present in fluid transmission lines used in the oil and gas industry.

2. Background and Related Art

Black powder is an industry name for the abrasive, reactive contamination particulate present in all gas and hydrocarbon fluid transmission lines. The black powder will range in color from light brown to black and the mineral makeup of the black powder will vary by location around the world. Black powder forms throughout the pipeline process, and is a composite of iron oxides, iron sulphides, and dirt and other material particulate such as silica, calcium, chloride, and sodium. Black powder results from both chemical and bacterial reactions within oil and gas systems.

All stages of a pipeline are vulnerable to erosion of pipeline components in the transmission line by exposure to black powder. Black powder damages pump seals, meters, valves, and compressor components, plating out and wearing on exchangers, trays, orifices and valves. Compromised components and instrumentation may lead to flow restriction and disrupted pressure boundaries.

In oil and gas pipelines, valves are particularly subject to black powder wear and its accompanying problems. In such pipelines, oil and gas transmission often occurs at relatively low temperature but relatively high pressures. Accordingly, when valves used in such systems are opened or closed, the valves are subject to localized areas of very high flow during the slightly open or nearly closed stage of valve opening and closing, increasing the potential for wear and other damage due to black powder present in the oil and gas. Additionally, black powder that passes through valve seals and seats and enters other valve areas can cause premature damage and wear on valve components, shortening the lifetime of the valve or necessitating more-frequent servicing. Existing through conduit valves for oil and gas pipelines and other oil and gas transmission systems have not fully dealt with the problems caused by black powder present in the pipelines, and are therefore subject to premature wear that may necessitate shutdown of the pipeline or process while the valve is serviced or replaced.

BRIEF SUMMARY OF THE INVENTION

Implementations of the invention provide valves having improved resistance to black powder wear and damage as compared to existing valves. According to implementations of the invention, a valve having improved resistance to black powder wear and damage includes a valve body adapted for connection in an oil or gas pipeline and defining a flow passage therethrough, an upper bonnet assembly attached to the valve body and defining a stem opening, and a stem passing through the stem opening. The valve also includes an elongate gate having a proximal end operatively attached to the stem, a distal end, an orifice sized and adapted to permit essentially unopposed passage of material through the gate when the orifice is aligned with the flow passage of the valve body, the orifice being located proximate the proximate end of the gate, and a solid portion sized and adapted to substantially completely block the flow of material through the gate when the solid portion is aligned with the flow passage of the valve body, the solid portion being located distally of the orifice such that the orifice is located between the proximal end and the solid portion.

The upper bonnet assembly may be sized to receive a portion of the elongate gate having the orifice while the valve is in service in the pipeline and in a closed state. The upper bonnet assembly may include an opening and associated cover sized to permit passage of the elongate gate therethrough such that the valve can be serviced and rebuilt, including removal of the elongate gate, without removing the valve from an oil or gas pipeline to which it is attached.

The valve may include a lower bonnet assembly attached to the valve body and sized to receive a portion of the elongate gate having the solid portion while the valve is in service in the pipeline and in an open state. The lower bonnet assembly may include a deinventory port adapted to permit access to the lower bonnet assembly and removal of material from the lower bonnet assembly.

The valve may also include a first live-loaded seat assembly extending between the body and the elongate gate on a first side of the elongate gate and a second live-loaded seat assembly extending between the body and the elongate gate on a second side of the elongate gate. The first and second live-loaded seat assemblies may provide a gas-tight seal between the valve body and the elongate gate. Each seat assembly may include O-rings between the seat assembly and the valve body. Such O-rings may prevent the passage of materials between the seat assembly and the valve body.

Each of the first and second live-loaded seat assemblies may include an extended seat plate encircling the flow passage adjacent the gate and extending upward into the upper bonnet. Each of the first and second live-loaded seat assemblies may also include a seat extension encircling the flow passage adjacent the gate and extending between the extended seat plate and the gate in a circumferential notch of the extended seat plate. Each of the first and second live-loaded seat assemblies may further include a live-loaded seat encircling the flow passage adjacent the gate. The live-loaded seat may include an inner portion extending between the valve body and the gate concentrically inward of the extended seat plate and an outer portion extending between the valve body and the extended seat plate. Each of the first and second live-loaded seat assemblies may include a first plurality of loading assemblies providing a load between the valve body and the live-loaded seat and a second plurality of loading assemblies providing a load between the live-loaded seat and the extended seat plate.

The seat extension may be formed from glass-filled nylon and creates a sealing surface against the gate. A sealing surface of the first and second live-loaded seat assemblies may include a hardened and toughened surface. A sealing surface of the first and second live-loaded seat assemblies may be formed of flame-sprayed nylon. Surfaces of the first and second live-loaded seat assemblies exposed to the flow passage, other than sealing surfaces of the first and second live-loaded seat assemblies, may include a polyurea surface treatment. The polyurea surface treatment may be a spray-on surface treatment. The solid portion of the gate may include a machined recess having a polytetrafluoroethylene (PTFE) surface treatment.

The first and second live-loaded seat assemblies may provide a sealing force of between two hundred fifty and three hundred fifty pounds per square inch on the gate. In some implementations, the first and second live-loaded seat assemblies provide a sealing force of approximately three hundred pounds per square inch on the gate.

The stem of the valve may be operatively connected to an electric planetary roller screw actuator attached to the upper bonnet assembly. The planetary roller screw actuator may be similar to the actuator disclosed in U.S. Pat. No. 9,388,342, which is incorporated herein by reference for all it discloses.

According to further implementations of the invention, a valve having improved resistance to black powder wear and damage includes a valve body adapted for connection in an oil or gas pipeline and defining a flow passage therethrough, an upper bonnet assembly attached to the valve body and defining a stem opening, and a stem passing through the stem opening. The valve also includes an elongate gate having a proximal end operatively attached to the stem, a distal end, an orifice sized and adapted to permit essentially unopposed passage of material through the gate when the orifice is aligned with the flow passage of the valve body, the orifice being located proximate the proximate end of the gate, and a solid portion sized and adapted to substantially completely block the flow of material through the gate when the solid portion is aligned with the flow passage of the valve body, the solid portion being located distally of the orifice such that the orifice is located between the proximal end and the solid portion. The valve also includes a first live-loaded seat assembly extending between the body and the elongate gate on a first side of the elongate gate, and a second live-loaded seat assembly extending between the body and the elongate gate on a second side of the elongate gate.

According to further implementations of the invention, a valve having improved resistance to black powder wear and damage includes a valve body adapted for connection in an oil or gas pipeline and defining a flow passage therethrough, an upper bonnet assembly attached to the valve body and defining a stem opening, and a stem passing through the stem opening. The valve also includes an elongate gate having a proximal end operatively attached to the stem, a distal end, an orifice sized and adapted to permit essentially unopposed passage of material through the gate when the orifice is aligned with the flow passage of the valve body, the orifice being located proximate the proximate end of the gate, and a solid portion sized and adapted to substantially completely block the flow of material through the gate when the solid portion is aligned with the flow passage of the valve body, the solid portion being located distally of the orifice such that the orifice is located between the proximal end and the solid portion. The valve also includes a first live-loaded seat assembly extending between the body and the elongate gate on a first side of the elongate gate, and a second live-loaded seat assembly extending between the body and the elongate gate on a second side of the elongate gate. Each of the first and second live-loaded seat assemblies includes an extended seat plate encircling the flow passage adjacent the gate and extending upward into the upper bonnet, a seat extension encircling the flow passage adjacent the gate and extending between the extended seat plate and the gate in a circumferential notch of the extended seat plate, and a live-loaded seat encircling the flow passage adjacent the gate. Each live-loaded seat includes an inner portion extending between the valve body and the gate concentrically inward of the extended seat plate and an outer portion extending between the valve body and the extended seat plate. Each of the first and second live-loaded seat assemblies includes a first plurality of loading assemblies providing a load between the valve body and the live-loaded seat, and a second plurality of loading assemblies providing a load between the live-loaded seat and the extended seat plate.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 10 shows a cross-sectional view of a pair of live-loaded seat assemblies at an upper end of a valve opening;

DETAILED DESCRIPTION OF THE INVENTION

Figure 1:
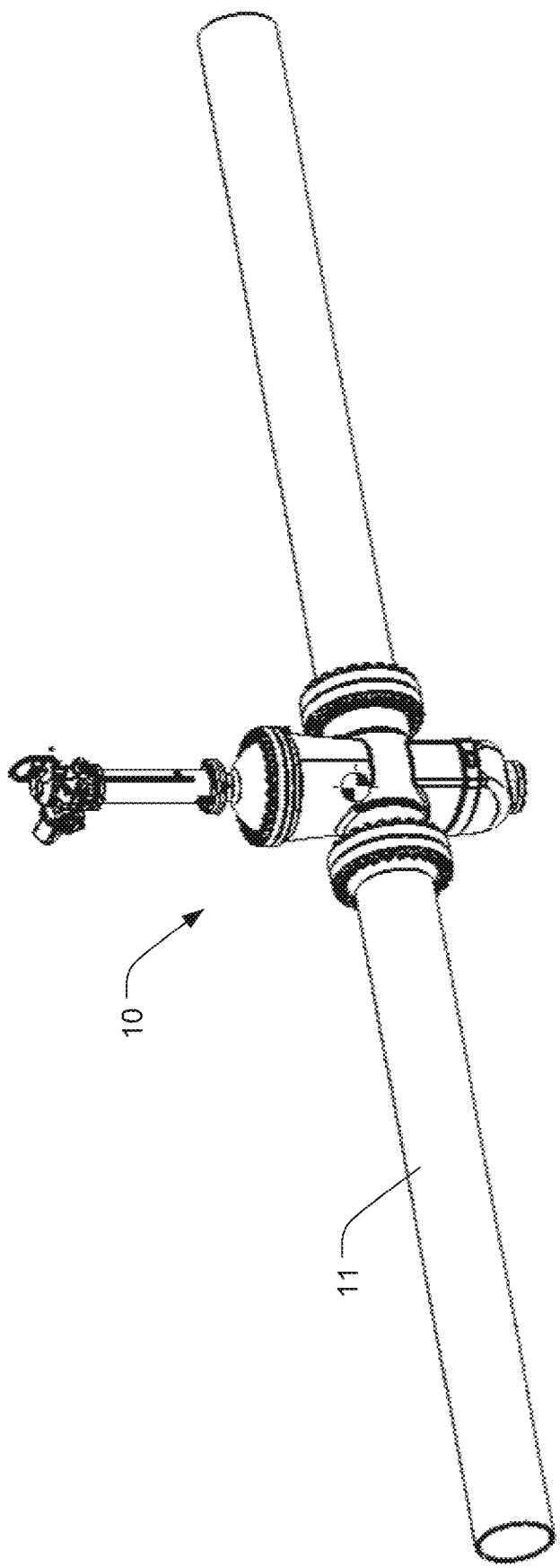
FIG. 1 shows a perspective view of a valve in an oil pipeline.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide valves having improved resistance to black powder wear and damage as compared to existing valves. According to embodiments of the invention, a valve having improved resistance to black powder wear and damage includes a valve body adapted for connection in an oil or gas pipeline and defining a flow passage therethrough, an upper bonnet assembly attached to the valve body and defining a stem opening, and a stem passing through the stem opening. The valve also includes an elongate gate having a proximal end operatively attached to the stem, a distal end, an orifice sized and adapted to permit essentially unopposed passage of material through the gate when the orifice is aligned with the flow passage of the valve body, the orifice being located proximate the proximate end of the gate, and a solid portion sized and adapted to substantially completely block the flow of material through the gate when the solid portion is aligned with the flow passage of the valve body, the solid portion being located distally of the orifice such that the orifice is located between the proximal end and the solid portion.

The upper bonnet assembly may be sized to receive a portion of the elongate gate having the orifice while the valve is in service in the pipeline and in a closed state. The upper bonnet assembly may include an opening and associated cover sized to permit passage of the elongate gate therethrough such that the valve can be serviced and rebuilt, including removal of the elongate gate, without removing the valve from an oil or gas pipeline to which it is attached.

The valve may include a lower bonnet assembly attached to the valve body and sized to receive a portion of the elongate gate having the solid portion while the valve is in service in the pipeline and in an open state. The lower bonnet assembly may include a deinventory port adapted to permit access to the lower bonnet assembly and removal of material from the lower bonnet assembly.

The valve may also include a first live-loaded seat assembly extending between the body and the elongate gate on a first side of the elongate gate and a second live-loaded seat assembly extending between the body and the elongate gate on a second side of the elongate gate. The first and second live-loaded seat assemblies may provide a gas-tight seal between the valve body and the elongate gate. Each seat assembly may include O-rings between the seat assembly and the valve body. Such O-rings may prevent the passage of materials between the seat assembly and the valve body.

Each of the first and second live-loaded seat assemblies may include an extended seat plate encircling the flow passage adjacent the gate and extending upward into the upper bonnet. Each of the first and second live-loaded seat assemblies may also include a seat extension encircling the flow passage adjacent the gate and extending between the extended seat plate and the gate in a circumferential notch of the extended seat plate. Each of the first and second live-loaded seat assemblies may further include a live-loaded seat encircling the flow passage adjacent the gate. The live-loaded seat may include an inner portion extending between the valve body and the gate concentrically inward of the extended seat plate and an outer portion extending between the valve body and the extended seat plate. Each of the first and second live-loaded seat assemblies may include a first plurality of loading assemblies providing a load between the valve body and the live-loaded seat and a second plurality of loading assemblies providing a load between the live-loaded seat and the extended seat plate.

The seat extension may be formed from glass-filled nylon and creates a sealing surface against the gate. A sealing surface of the first and second live-loaded seat assemblies may include a hardened and toughened surface. A sealing surface of the first and second live-loaded seat assemblies may be formed of flame-sprayed nylon. Surfaces of the first and second live-loaded seat assemblies exposed to the flow passage, other than sealing surfaces of the first and second live-loaded seat assemblies, may include a polyurea surface treatment. The polyurea surface treatment may be a spray-on surface treatment. The solid portion of the gate may include a machined recess having a polytetrafluoroethylene (PTFE) surface treatment.

The first and second live-loaded seat assemblies may provide a sealing force of between two hundred fifty and three hundred fifty pounds per square inch on the gate. In some embodiments, the first and second live-loaded seat assemblies provide a sealing force of approximately three hundred pounds per square inch on the gate.

The stem of the valve may be operatively connected to an electric planetary roller screw actuator attached to the upper bonnet assembly. The planetary roller screw actuator may be similar to the actuator disclosed in U.S. Pat. No. 9,388,342, which is incorporated herein by reference for all it discloses.

According to further embodiments of the invention, a valve having improved resistance to black powder wear and damage includes a valve body adapted for connection in an oil or gas pipeline and defining a flow passage therethrough, an upper bonnet assembly attached to the valve body and defining a stem opening, and a stem passing through the stem opening. The valve also includes an elongate gate having a proximal end operatively attached to the stem, a distal end, an orifice sized and adapted to permit essentially unopposed passage of material through the gate when the orifice is aligned with the flow passage of the valve body, the orifice being located proximate the proximate end of the gate, and a solid portion sized and adapted to substantially completely block the flow of material through the gate when the solid portion is aligned with the flow passage of the valve body, the solid portion being located distally of the orifice such that the orifice is located between the proximal end and the solid portion. The valve also includes a first live-loaded seat assembly extending between the body and the elongate gate on a first side of the elongate gate, and a second live-loaded seat assembly extending between the body and the elongate gate on a second side of the elongate gate.

According to further embodiments of the invention, a valve having improved resistance to black powder wear and damage includes a valve body adapted for connection in an oil or gas pipeline and defining a flow passage therethrough, an upper bonnet assembly attached to the valve body and defining a stem opening, and a stem passing through the stem opening. The valve also includes an elongate gate having a proximal end operatively attached to the stem, a distal end, an orifice sized and adapted to permit essentially unopposed passage of material through the gate when the orifice is aligned with the flow passage of the valve body, the orifice being located proximate the proximate end of the gate, and a solid portion sized and adapted to substantially completely block the flow of material through the gate when the solid portion is aligned with the flow passage of the valve body, the solid portion being located distally of the orifice such that the orifice is located between the proximal end and the solid portion. The valve also includes a first live-loaded seat assembly extending between the body and the elongate gate on a first side of the elongate gate, and a second live-loaded seat assembly extending between the body and the elongate gate on a second side of the elongate gate. Each of the first and second live-loaded seat assemblies includes an extended seat plate encircling the flow passage adjacent the gate and extending upward into the upper bonnet, a seat extension encircling the flow passage adjacent the gate and extending between the extended seat plate and the gate in a circumferential notch of the extended seat plate, and a live-loaded seat encircling the flow passage adjacent the gate. Each live-loaded seat includes an inner portion extending between the valve body and the gate concentrically inward of the extended seat plate and an outer portion extending between the valve body and the extended seat plate. Each of the first and second live-loaded seat assemblies includes a first plurality of loading assemblies providing a load between the valve body and the live-loaded seat, and a second plurality of loading assemblies providing a load between the live-loaded seat and the extended seat plate.

FIG. 1 shows an embodiment of a valve 10 illustrating features in accordance with embodiments of the invention in situ in an oil pipeline 11. While embodiments of valve 10 are deemed of particular interest to oil and gas pipelines, conduits, and process lines, where wear and damage problems due to the presence of black powder in the medium flowing through the pipeline, conduit, or process line are prevalent, it should be noted that valves similar to or incorporating features illustrated by valve 10 may be used in a variety of situations where erosion, wear, or damage due to abrasive material flow are considerations. There are a variety of features illustrated in valve 10 that help prevent damage in such situations and that will be discussed herein.

Figure 2:
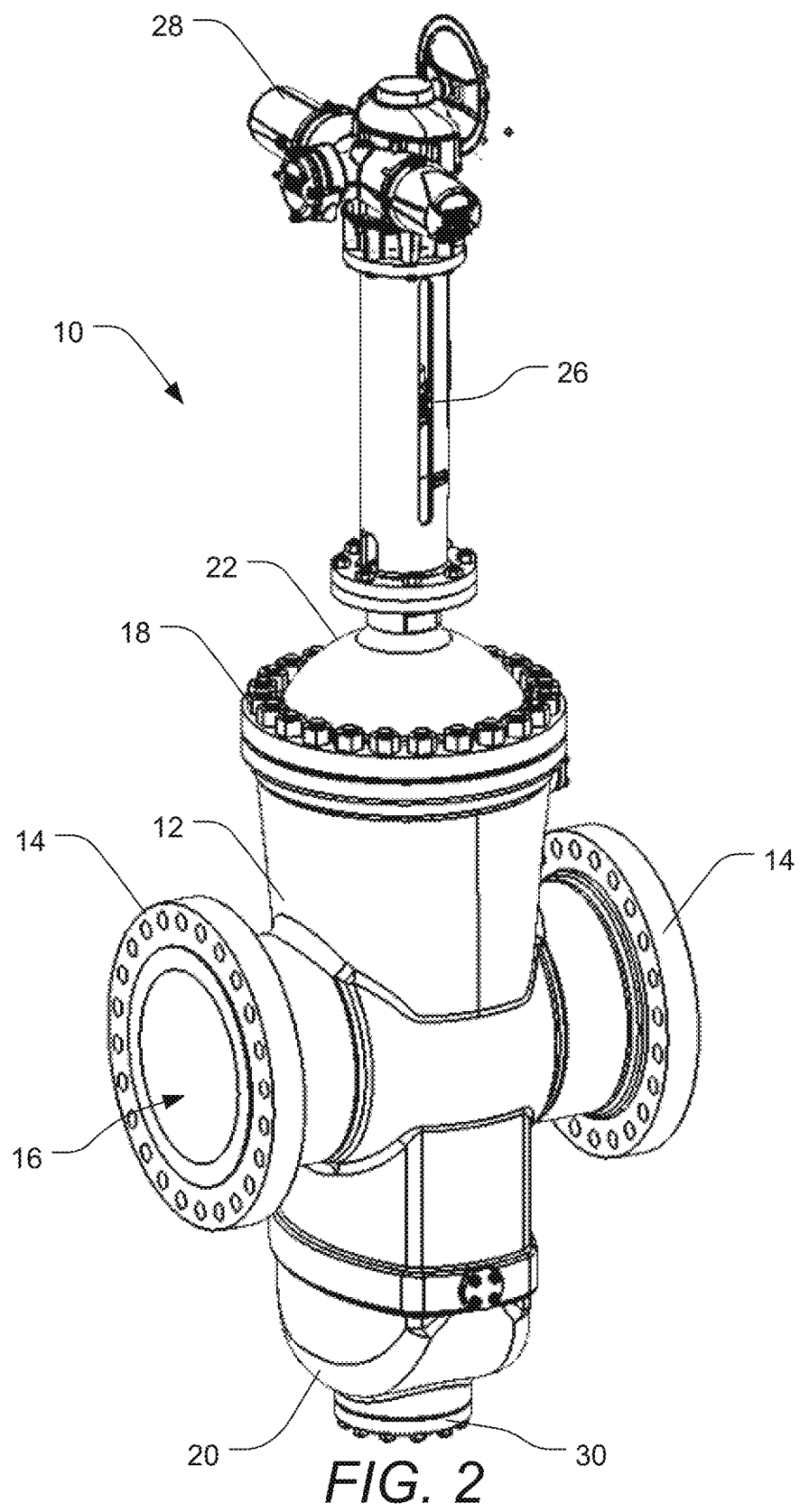
FIG. 2 shows a perspective view of a valve.

FIG. 2 shows a perspective view of the valve 10 isolated from the oil pipeline 11. The valve 10 includes a valve body 12, which has flanges 14 thereon adapted to permit connecting the valve body 12 to the oil pipeline 11. The valve body 12 is shown in more detail in FIGS. 4 and 5. The valve body 12 defines a flow path 16 or flow passage through the body, through which oil or gas flows when the valve 10 is in use and the valve 10 is open. When the valve 10 is operated to close the valve 10, the flow path 16 is interrupted by a gate (not shown in FIG. 2).

The valve 10 includes an upper bonnet assembly 18 and a lower bonnet assembly 20. A portion of the upper bonnet assembly 18 and a portion of the lower bonnet assembly 20 may be formed with the valve body 12. The upper bonnet assembly 18 is sized and shaped to receive a portion of the gate therein during operation of the valve 10 while the valve 10 is in use and closed or partially closed. Similarly, the lower bonnet assembly 20 is sized and shaped to receive a portion of the gate therein during operation of the valve 10 while the valve 10 is in use and open or partially open.

The upper bonnet assembly 18 includes a bonnet 22 that defines a stem opening 24 (see FIG. 7) through which a stem from an actuator assembly 26 passes into the internal space of the valve body 12. The actuator assembly 26 may include a position indicator that provides an external viewable indication of a position of the gate within the valve body 12. The actuator assembly 26 includes an actuator 28, which may be any type of actuator suitable for performing the functions discussed herein. In one embodiment, the actuator 28 is a planetary roller screw electric actuator operating on the principles discussed in U.S. Pat. No. 9,388,342, incorporated herein by reference for all it discloses. In alternate embodiments, the actuator 28 is a hydraulic actuator. Any adequate type of actuator may be used, but the actuator 28 should be capable of providing sufficient force to actuate the gate given the constraints discussed in more detail below, including overcoming the force applied to the gate by the live-loaded seat assemblies, which is significantly higher than prior valves.

The lower bonnet assembly 20 of valve 10 includes a deinventory port 30 covered by a cover that may be removed to permit removal of any materials that may enter into the lower bonnet from the flow path 16. While the valve 10 is significantly resistant to the entry of materials, and particularly black powder, into the upper bonnet assembly 18 or the lower bonnet assembly 20, the deinventory port 30 provides a convenient mechanism for removing any materials that do enter into the lower bonnet assembly 20. Because the seal provided by the gate and seals of the valve is resistant to passage of material into the upper bonnet assembly 18 or the lower bonnet assembly 20, the deinventory port 30 may even be opened while the pipeline is in use, regardless of whether the valve 10 is in an open or closed state. The upper bonnet assembly 18 and the lower bonnet assembly 20 may be inert gas purged.

Figure 3:
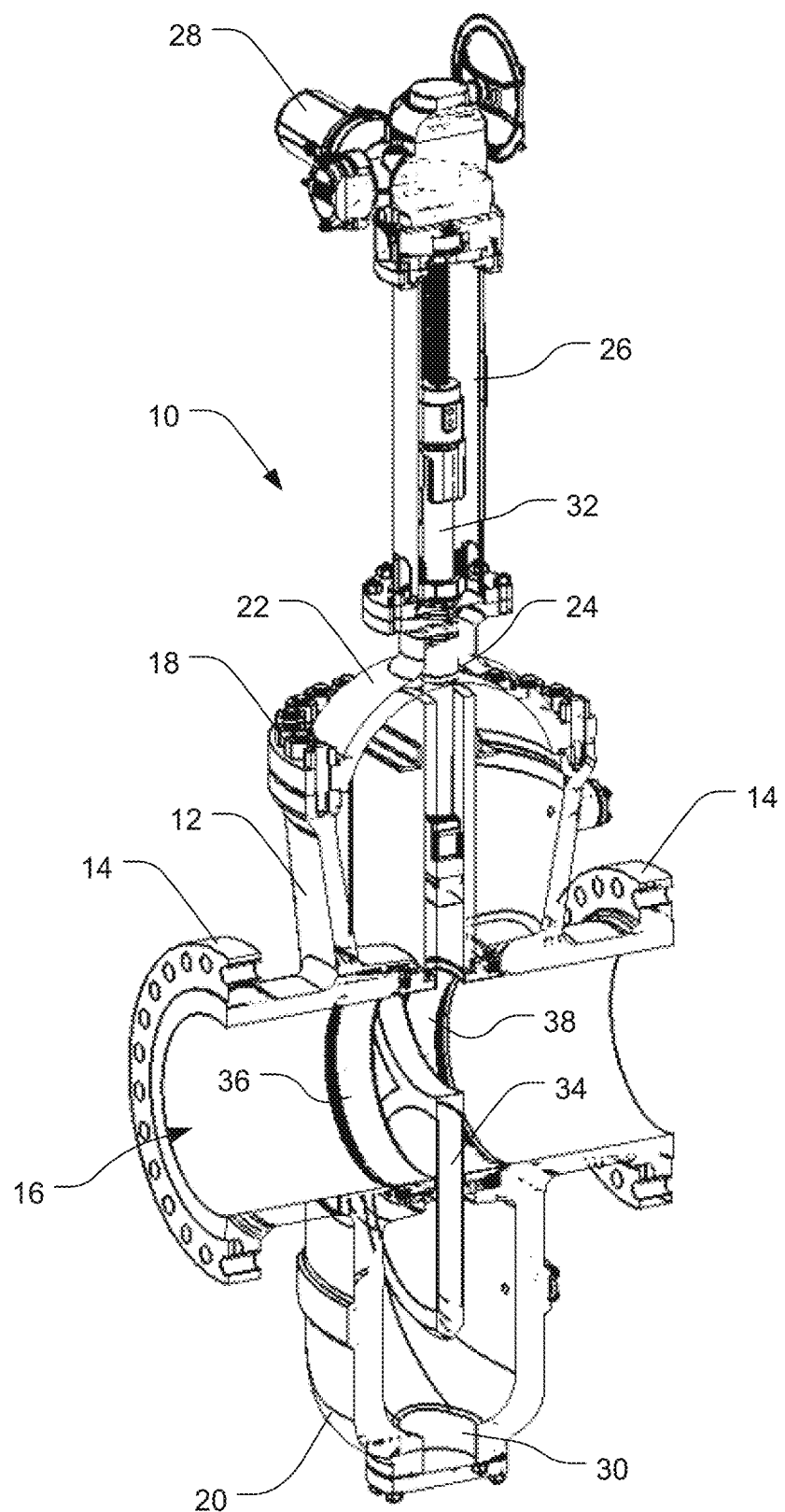
FIG. 3 shows a cutaway view of a valve; in a partially-open position.

FIG. 3 shows a cutaway view of the valve 10 of FIG. 2. In this view, a stem 32 is visible extending from the actuator 28 to an elongate gate 34. The elongate gate 34 is disposed is a sliding relation between a first live-loaded seat assembly 36 and a second live-loaded seat assembly 38. The first live-loaded seat assembly 36 and the second live-loaded seat assembly 38 provide seals between the valve body 12 and the elongate gate 34, such that oil, gas, or other hydrocarbon products in the pipeline 11 do not enter into portions of the valve 10 other than the flow path 16 defined by the valve body 12, the live-loaded seat assemblies 36, 38, and the elongate gate 34. As may be seen in FIG. 3, the first live-loaded seat assembly 36 and the second live-loaded seat assembly 38 are arranged within the valve body 12 in mirror orientation around the elongate gate 34, and are identically designed, so flow through the valve body 12 can be in either direction. More details regarding the first and second live-loaded seat assemblies 36, 38 are provided below, especially with respect to FIGS. 8-10.

Figure 4:
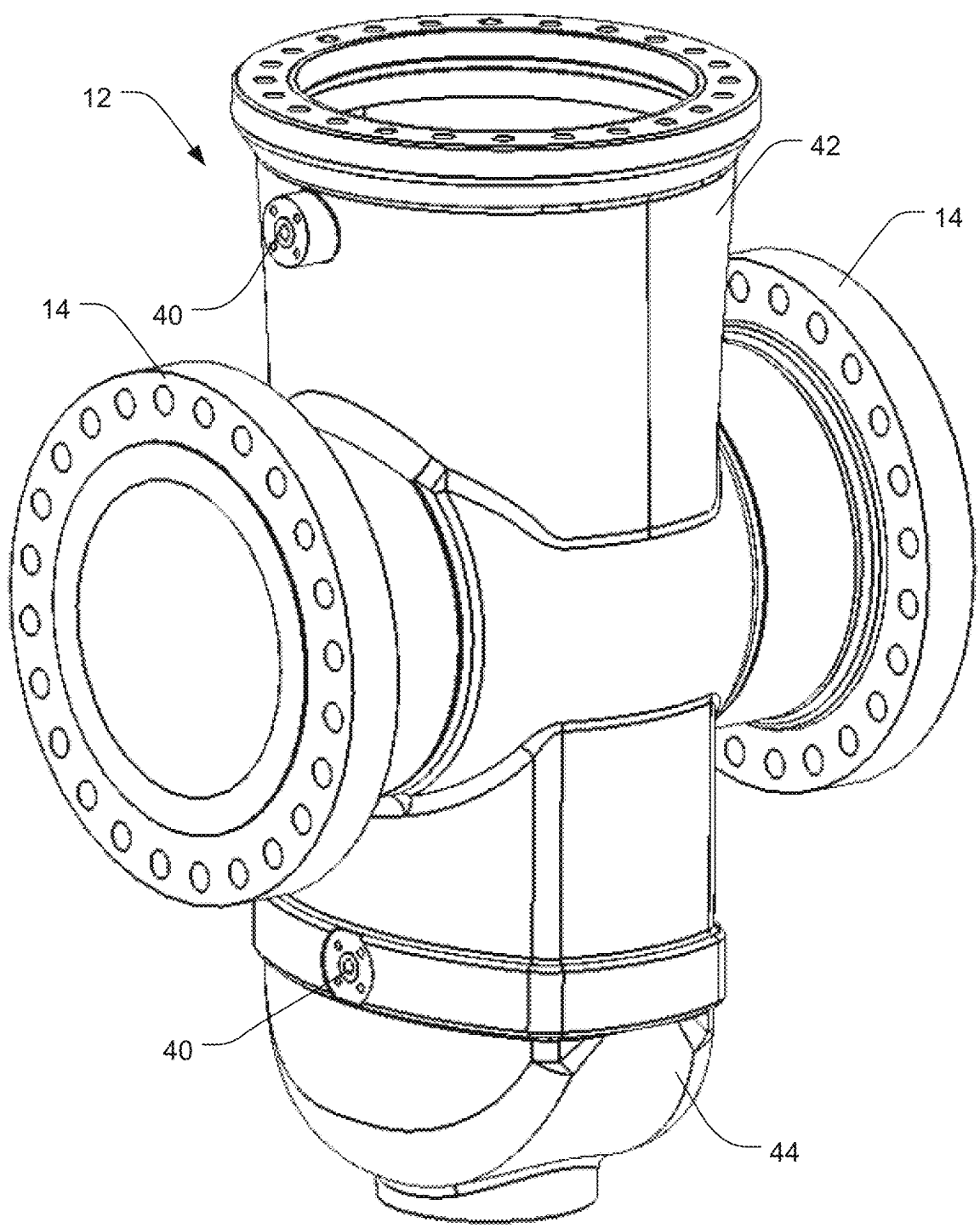
FIG. 4 shows a view of a valve body.
Figure 5:
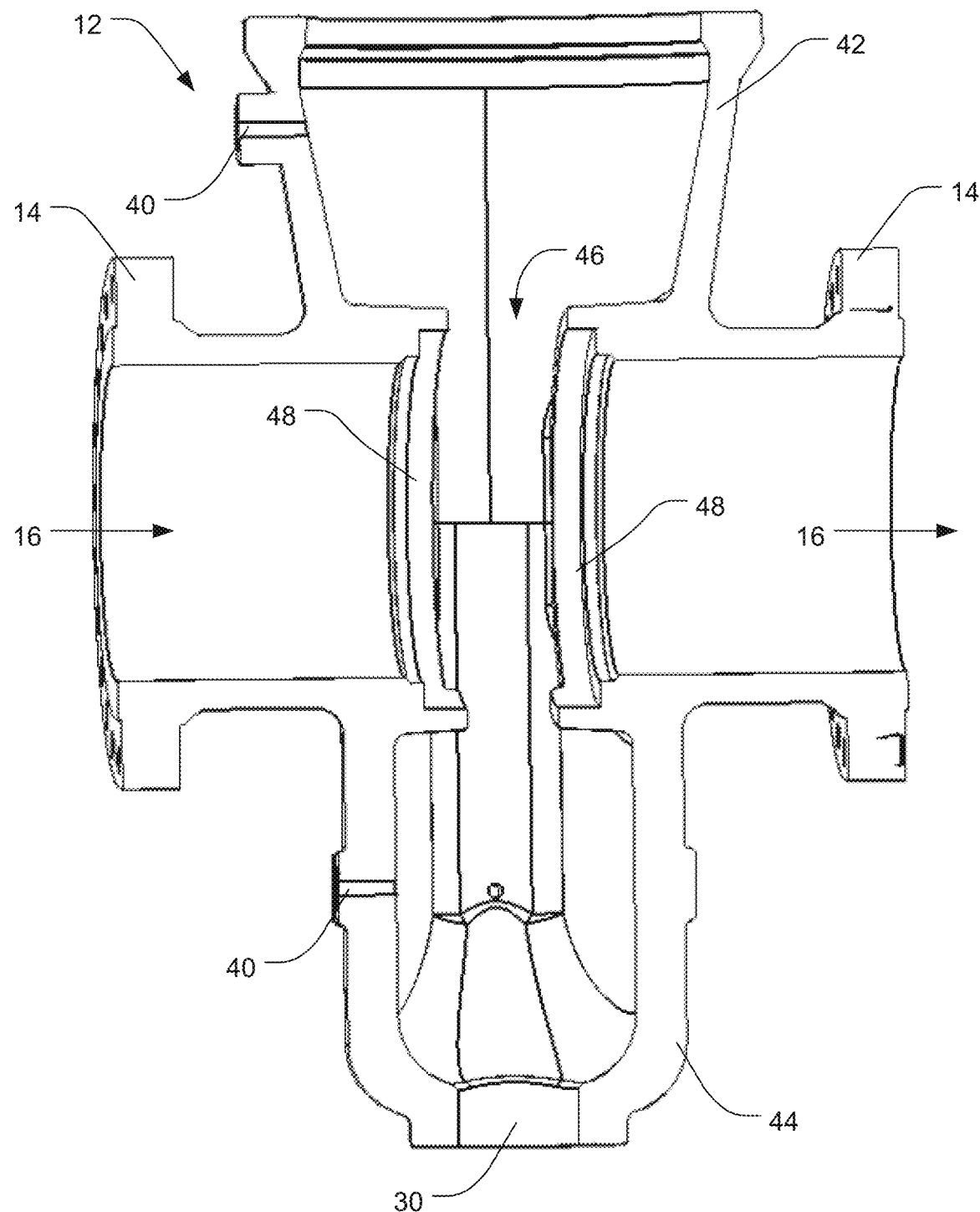
FIG. 5 shows a cutaway view of the valve body of FIG. 4.

FIG. 4 shows a perspective view of the valve body 12, and FIG. 5 shows a cross-sectional view of the valve body 12. The valve body 12 may include one or more purge ports 40, such as a purge port 40 on an upper bonnet area 42 of the valve body 12 and a purge port 40 on a lower bonnet area 44 of the valve body. The upper bonnet area 42 may form a part of the upper bonnet assembly 18 and provides a point of connection for the bonnet 22. The upper bonnet area 42 may provide a volume adapted to house a portion of the elongate gate 34, including when the elongate gate 34 is closed or partially closed across or blocking the flow path 16. Accordingly, the upper bonnet area 42, along with any additional volume defined by the bonnet 22 has a height and a depth adapted to receive at least half the length of the elongate gate 34 as well as the full width of the elongate gate 34. Similarly, the lower bonnet area 44 may form a part of the lower bonnet assembly 20 and provides a point of connection for the cover for the deinventory port 30. The lower bonnet area 44 may provide a volume adapted to house a portion of the elongate gate 34, including when the elongate gate 34 is open or partially open, allowing the passage of material through the flow path 16. Accordingly, the lower bonnet area 44 has a height and a depth adapted to receive approximately half the length of the elongate gate 34 as well as the full width of the elongate gate 34, at least over a portion of the height of the lower bonnet area 44.

Figure 15:
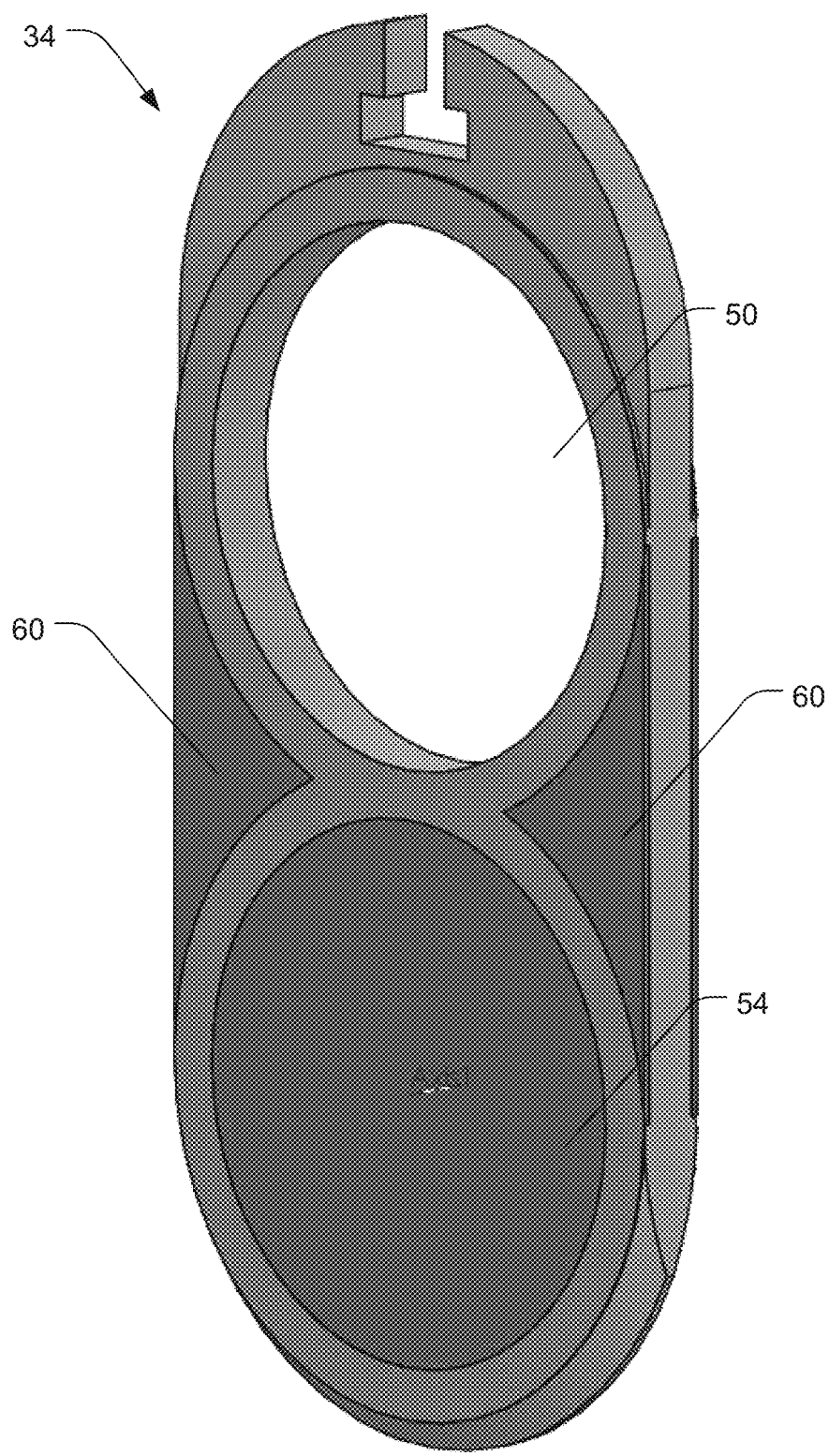
FIG. 15 shows a perspective view of an elongate gate.
Figure 16:
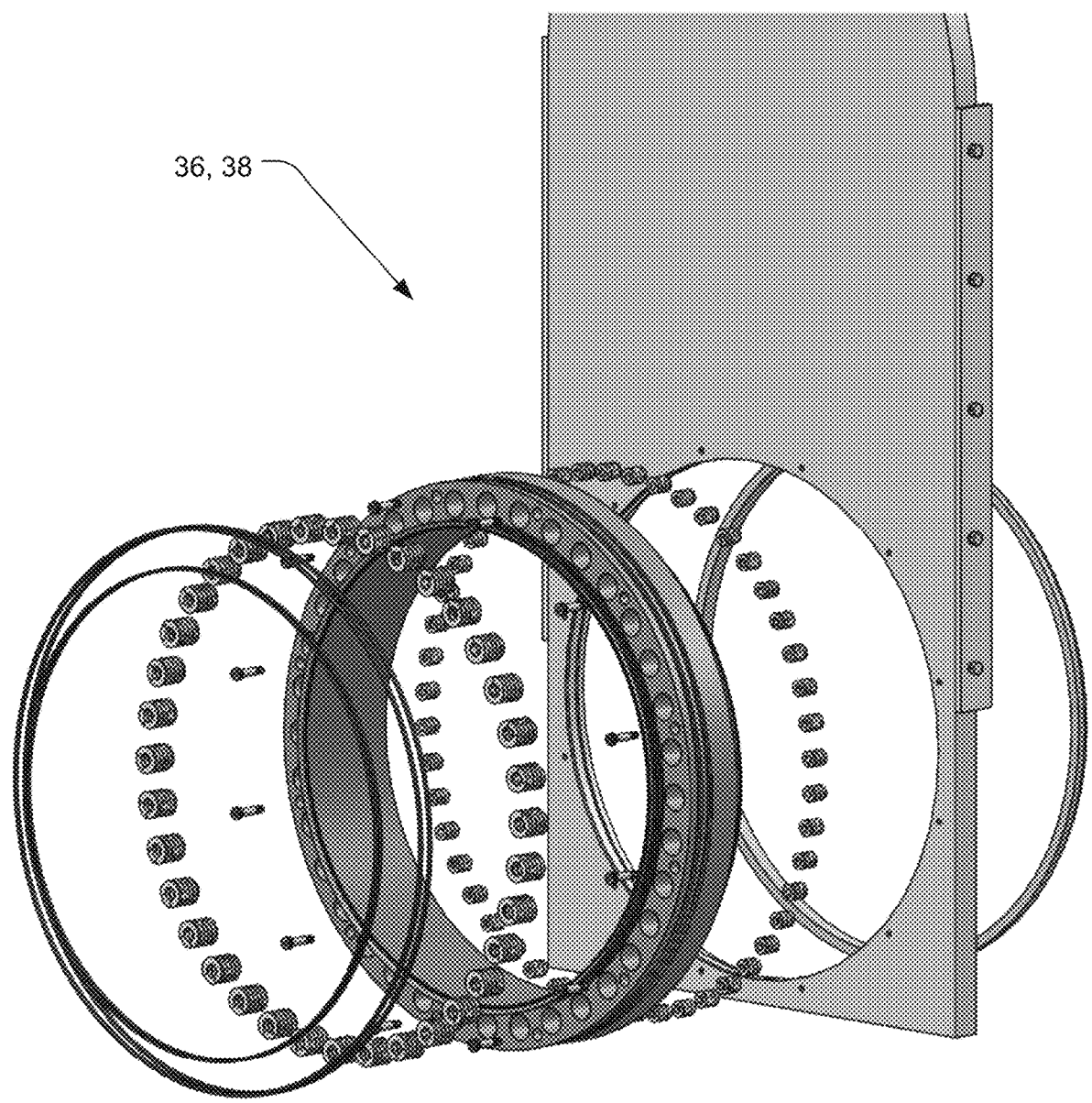
FIG. 16 shows an exploded view of a live-loaded seat assembly.
Figure 17:
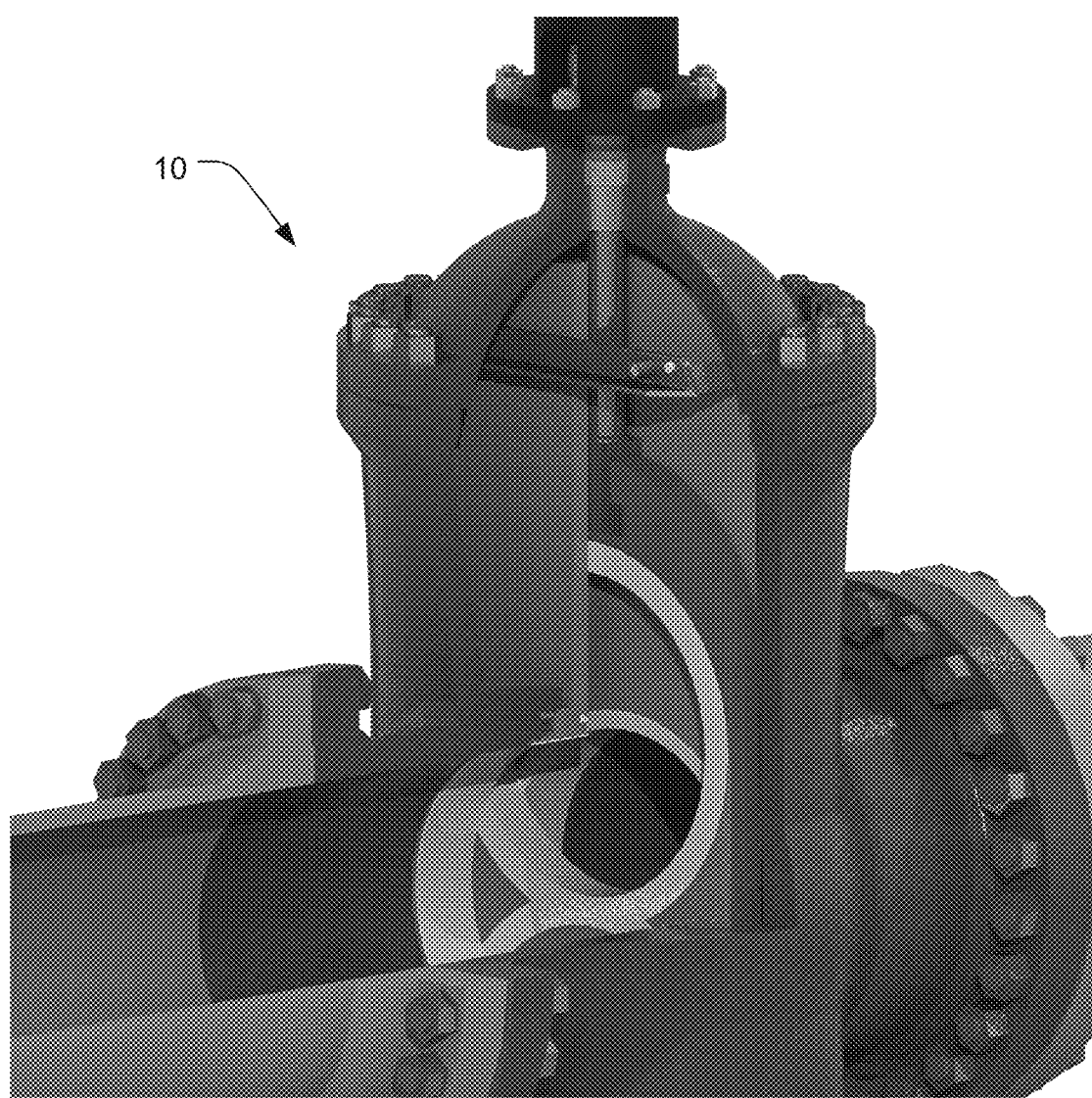
FIG. 17 shows a partially cut-away view of a valve in an oil pipeline.
Figure 18:
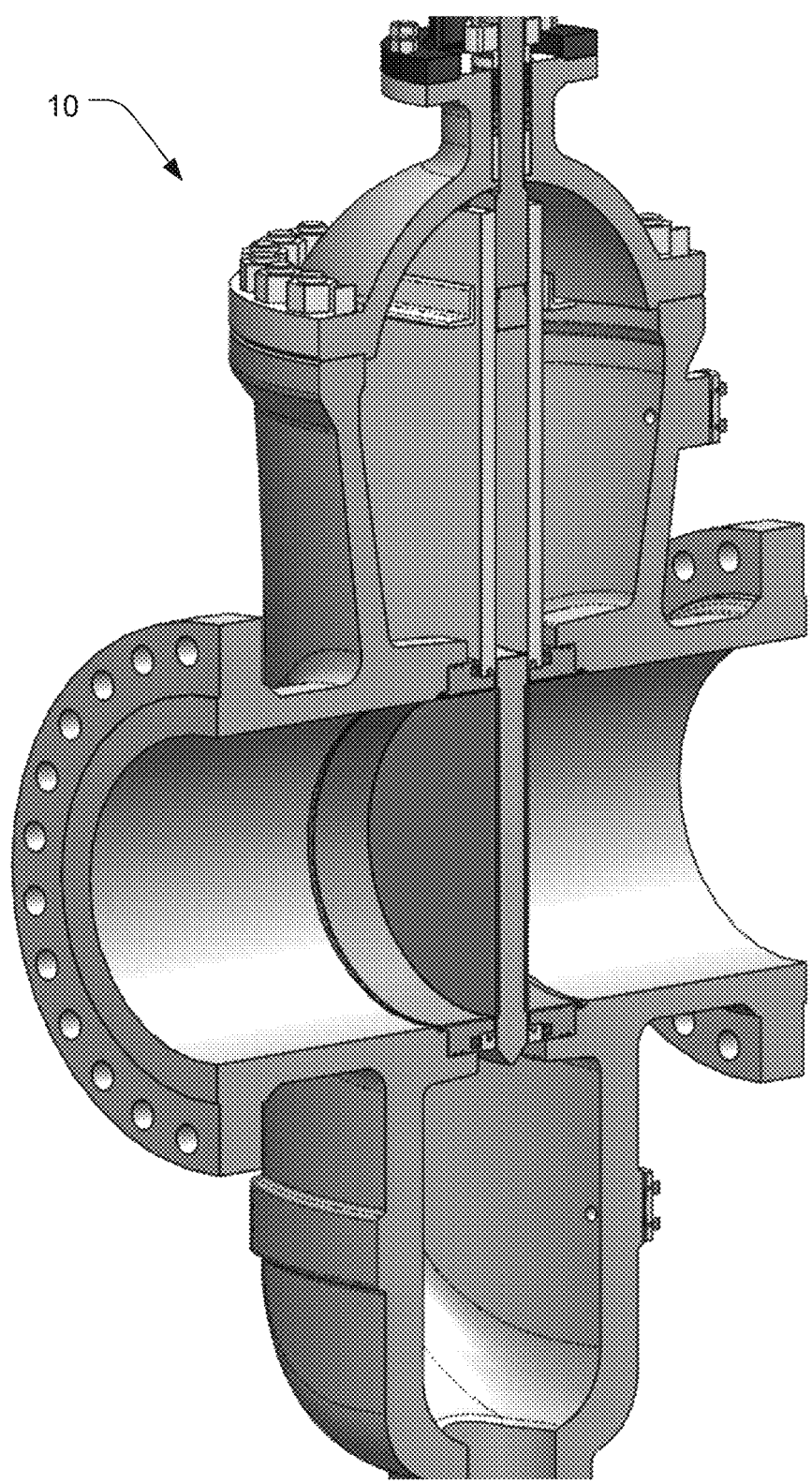
FIG. 18 shows a cut-away view of a valve in a closed position.
Figure 19:
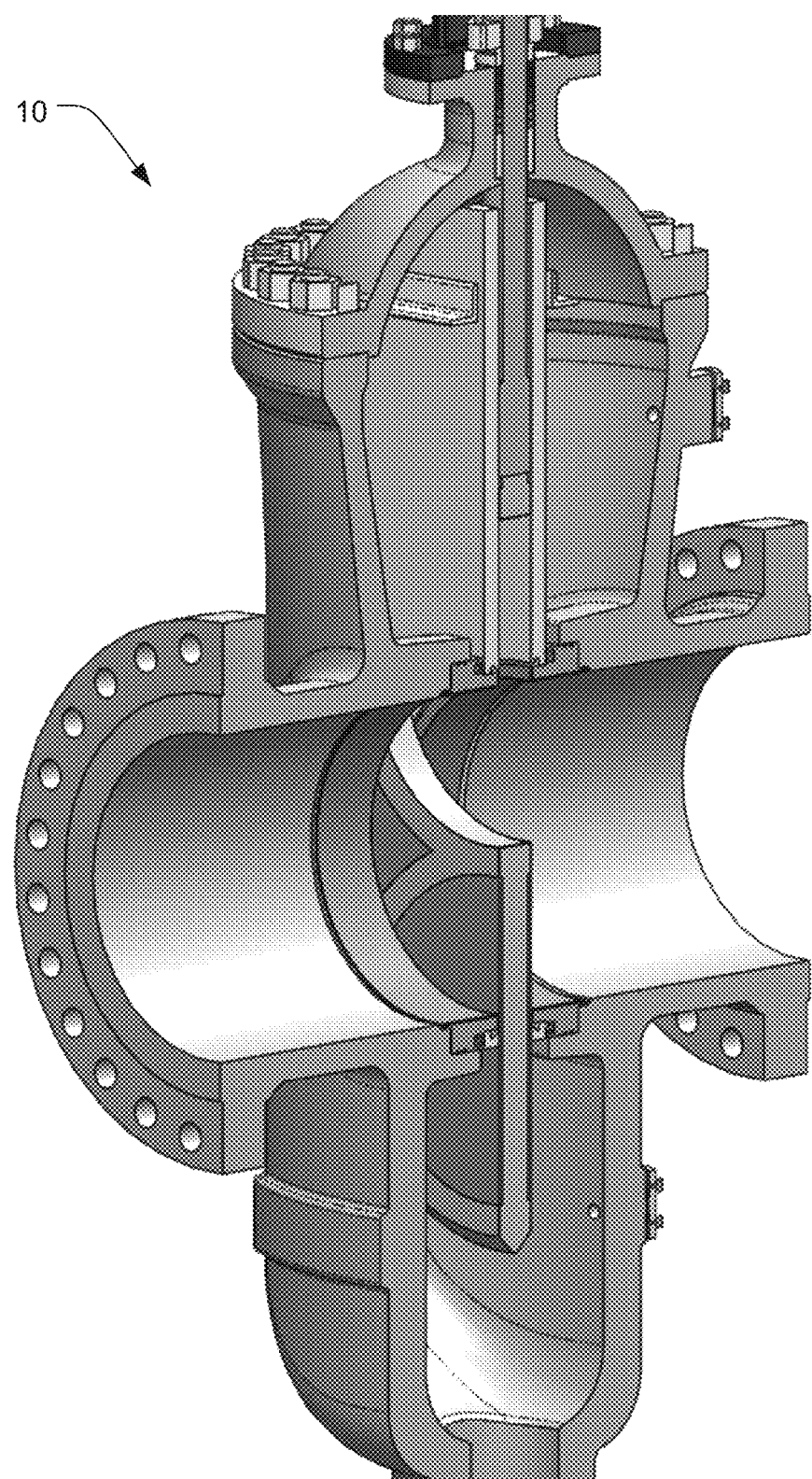
FIG. 19 shows a cut-away view of a valve in a partially open position.
Figure 20:
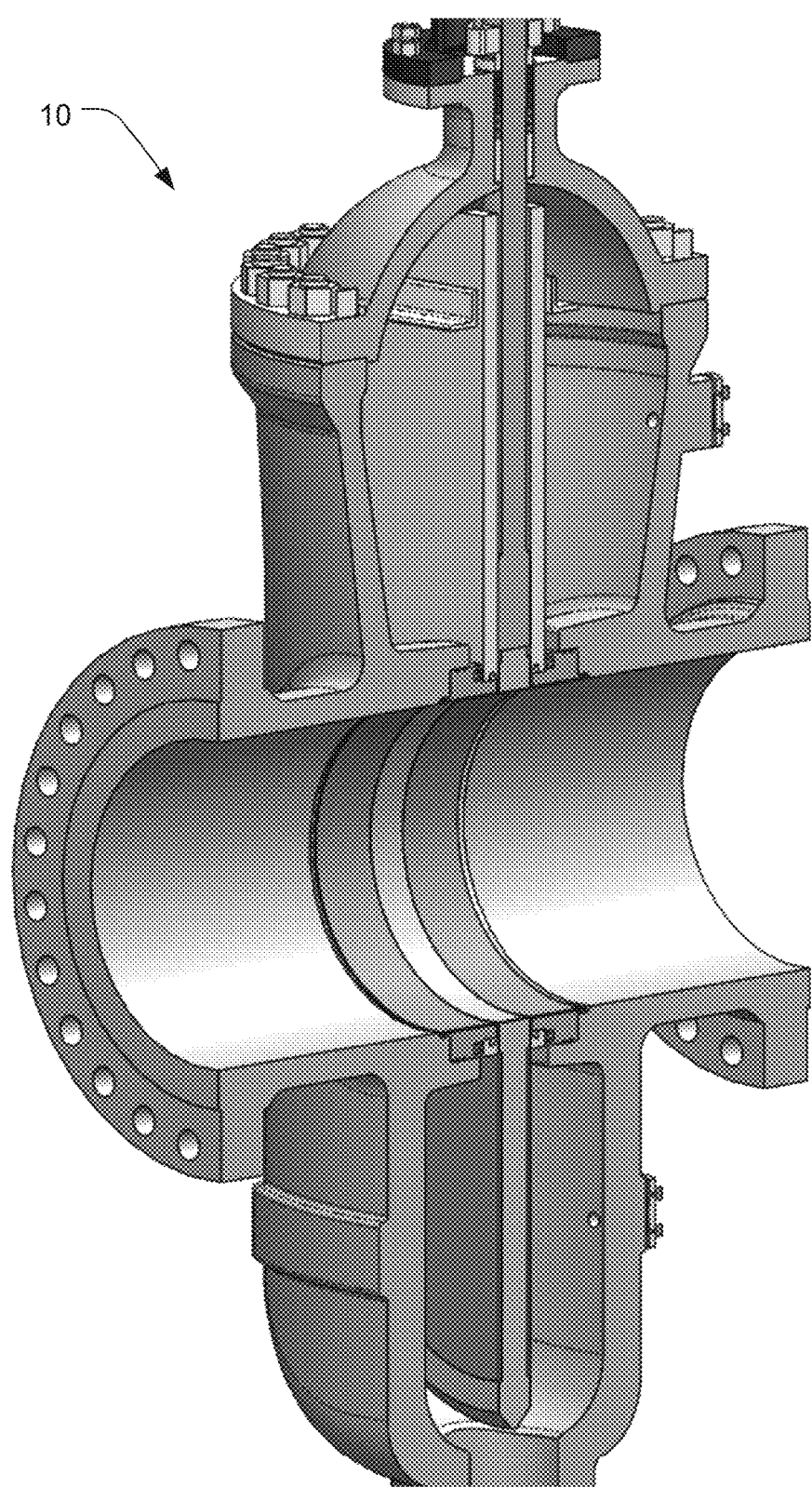
FIG. 20 shows a cut-away view of a valve in a fully open position.

As may be seen in FIG. 5, the valve body 12 defines the flow path 16 through the valve body as a generally cylindrical volume. At the center of the valve body 12, the flow path 16 defined by the walls of the valve body 12 opens into a gate channel 46 adapted to receive the elongate gate 34 therein in a slidable relationship that allows the elongate gate 34 to slide up or down within the gate channel 46 to control flow through the flow path 16. The gate channel 46 of the valve body 12 is flanked on either side by circumferential grooves 48 that are formed and adapted (i.e., sized and shaped) to receive portions of the first and second live-loaded seat assemblies 36, 38 therein and to permit loading of the first and second live-loaded seat assemblies 36, 38 between the valve body 12 and the elongate gate 34, thereby establishing and maintaining a seal between the valve body 12 and the elongate gate 34 such that material flowing through the pipeline cannot or cannot substantially leave the flow path 16 and enter into the upper bonnet area 42 or the lower bonnet area 44 (except for a small portion contained within an orifice 50 of the elongate gate 34 (illustrated in FIGS. 6 and 15) while the gate 34 is closed but that remains fully contained within the first live-loaded seat assembly 36 and the second live-loaded seat assembly 38 until it is returned to the flow path 16).

Figure 6:
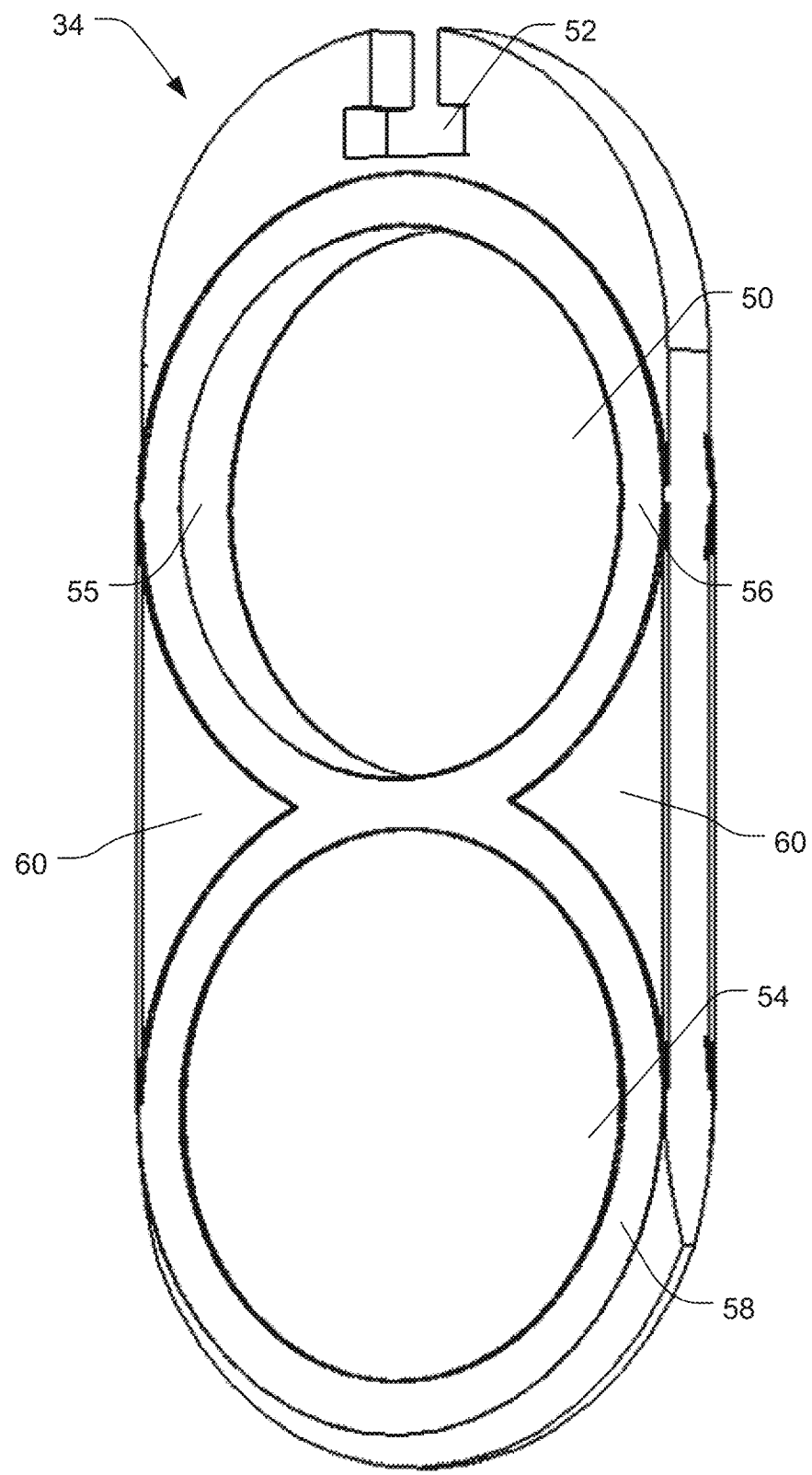
FIG. 6 shows a perspective view of an elongate gate.

FIG. 6 illustrates the elongate gate 34 and its orifice 50 or aperture that is sized and shaped to match the size and shape of the flow path 16 through the valve body 12, such that when the valve 10 is fully open, material flowing through the valve 10 may flow uninterrupted. The elongate gate 34 also includes a stem-engaging notch 52 located at a proximal end of the elongate gate 34. The stem-engaging notch 52 is configured to engage a correspondingly-shaped gate-engaging protrusion (not shown) attached to or formed with the stem 32 such that when the actuator 28 is actuated and drives the stem 32 further in or out of the valve body 12, the elongate gate 34 is correspondingly actuated (slid) to open and close the valve 10. While the stem-engaging notch 52 and the corresponding structure on the stem 32 provide one method of attachment between the stem 32 and the elongate gate 34, any other suitable method of attachment may also be used, including forming or attaching the stem 32 integrally with the elongate gate 34.

As may be seen in FIG. 6, the orifice 50 is positioned on the elongate gate 34 proximate to the stem end or proximate end of the elongate gate 34 and accordingly proximate to the stem-engaging notch 52, such that the valve 10 is open when the actuator 28 is actuated to move the stem 32 to is most-distal (relevant to the actuator 28) extent. In such a position, a solid portion 54 of the elongate gate 34 that is adapted to be sealed between the first and second live-loaded seat assemblies 36, 38 to close the valve 10 is suspended below the flow path 16 and within the lower bonnet assembly 20. When the valve 10 is to be closed, the actuator 28 is actuated to move the stem 32 to its most-proximal (relevant to the actuator 28) extent. In such a position, the solid portion 54 fully obstructs the flow path 16, and the portion of the elongate gate 34 containing the orifice 50 is elevated above the flow path 16 and within the upper bonnet assembly 18 (though still within and between extended upper portions of the first and second live-loaded seat assemblies 36, 38, as will be discussed further hereafter).

An inner surface 55 of the orifice 50 may optionally receive a surface treatment similar to a surface treatment of the flow path 16 of the valve body 12, such as, for example, a polyurea spray treatment. The elongate gate 34 includes a generally flat major surface on each side of the elongate gate 34 that is adapted to engage with the first and second live-loaded seat assemblies 36, 38 and to form a seal therewith. An orifice-surrounding area 56 surrounds the orifice 50 and is adapted to form a seal with the first and second live-loaded seat assemblies 36, 38 when the elongate gate 34 is lowered into the open position, may be machined and/or receive a surface treatment to enhance hardness, toughness, and/or durability of the orifice-surrounding area 56, as the orifice-surrounding area is one of two areas most likely to be in long-term sealing relationship with the first and second live-loaded seat assemblies 36, 38. The other area most likely to be in long-term sealing relationship with the first and second live-loaded seat assemblies 36, 38 is a solid-portion-surrounding area 58, which may be similarly machined and/or received a surface treatment to enhance hardness, toughness, and/or durability. As may be seen in FIG. 6, a portion of the orifice-surrounding area 56 and a portion of the solid-portion-surrounding area 58 located between the orifice 50 and the solid portion 56 may be shared.

In typical use, the valve 10 will not be used to control flow, but will be used as a simple on-off valve, whereby either the orifice 50 or the solid portion 54 will be fully located in the flow path 16 except during periods of transition between on and off states. As many pipelines flow nearly continuously, it is anticipated that valve 10 may remain in an open state a majority of the time, though there is no particular requirement that valve 10 remain open normally.

Other portions of the major surfaces of the elongate gate 34, including the surfaces of the solid portion 54 and surfaces 60 extending between and along the sides of the orifice-surrounding area 56 and the solid-portion-surrounding area 58 will maintain a seal with the first and second live-loaded seat assemblies 35, 38 for short periods of time while the valve 10 is being actuated between open and closed positions. Such surfaces will temporarily receive contact from sealing portions of the first and second live-loaded seat assemblies 35, 38 while the elongate gate 34 is sliding between its open and closed states, and such surfaces may receive a surface treatment to enhance hardness, toughness, and/or durability, and/or to reduce friction between the elongate gate 34 and the first and second live-loaded seat assemblies 36, 38 to facilitate actuation of the elongate gate 34. For example, such surfaces may be machined or otherwise formed slightly (e.g., just one thou or one mil in thickness) recessed so as to be able to receive a surface coating such as polyurea or spray polytetrafluoroethylene (PTFE). As another example, portions of the major surfaces of the elongate gate 34, including the orifice-surrounding portion 56 and the solid-portion-surrounding portion 58 may receive a flame-spray nylon coating to reduce thrust requirements of the actuator 28. As another example such areas as well as the surface of the solid portion 54 and the surfaces 60 may all be coated with a coating such as a flame-spray nylon coating to reduce thrust requirements of the actuator 28.

Figure 7:
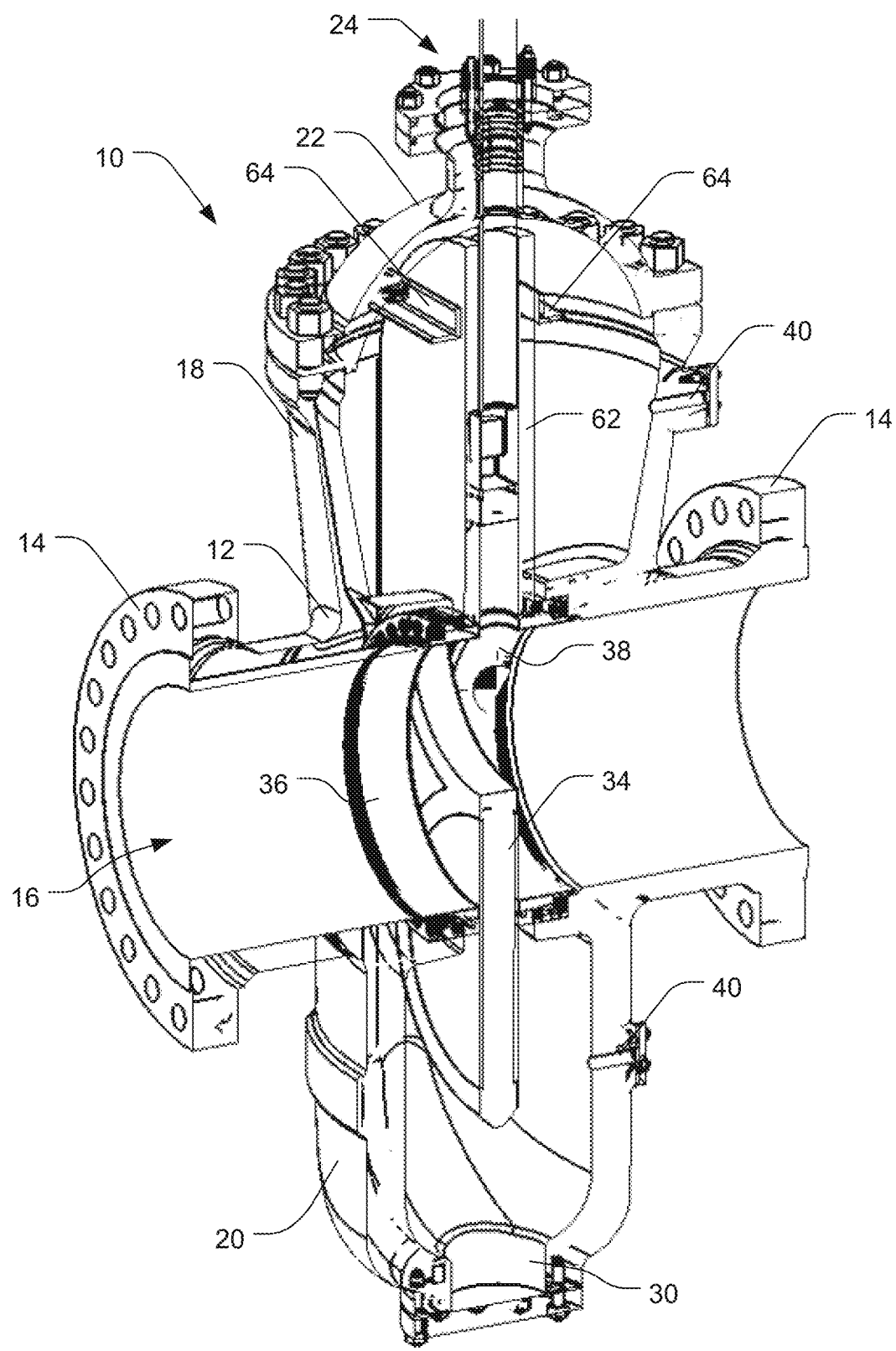
FIG. 7 shows a cutaway view of a valve in a partially-open position.
Figure 8:
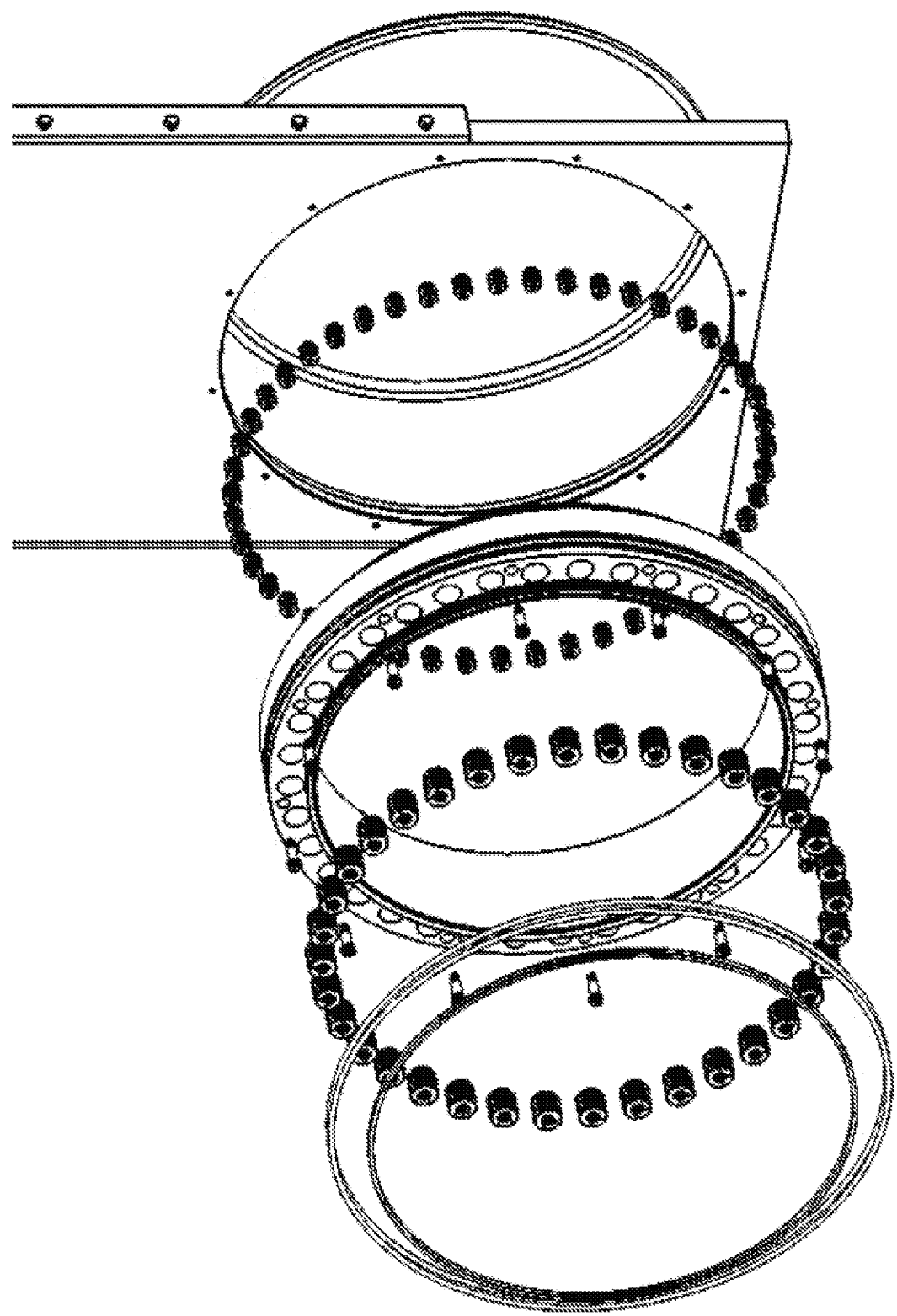
FIG. 8 shows an exploded view of a live-loaded seat assembly.

FIG. 7 illustrates a cut-away view of the valve 10 without showing the actuator 28, so that the internal components of the valve 10 are more visible. As may be seen in FIG. 7, the first and second live-loaded seat assemblies 36, 38 each include an extended seat plate 62 that extends upward into the upper bonnet assembly 18, where each extended seat plate 62 is retained against outward motion by an L-shaped bracket 64 that is attached to the bonnet 22. To further illustrate the first and second live-loaded seat assemblies 36, 38, FIG. 8 provides an exploded view of one live-loaded seat assembly 36, 38. As discussed above, each of the first and second live-loaded seat assemblies 36, 38 is identically designed but is placed in the valve body 12 in mirror orientation around the elongate gate 34.

Embodiments of the valve utilize a high level of sealing force between the live-loaded seat assemblies 36, 38 and the elongate gate 34. For example, where previous pipeline valves might utilize a seal pressure on the order of approximately one hundred twenty-five pounds per square inch, embodiments of valve 10 utilize a seal pressure between the first and second live-loaded seat assemblies 36, 38 and the elongate gate 34 on the order of approximately three hundred pounds per square inch, greatly enhancing the resultant seal to reduce or eliminate the passage of hydrocarbons and/or black powder between the first and second live-loaded seat assemblies 36, 38 and the elongate gate 34.

It should be understood that the figure of three hundred pounds per square inch is not intended to be limiting, that the sealing force could be any amount between approximately two hundred pounds per square inch and approximately four hundred pounds per square inch, and any lesser range encompassed within the greater range, such as between approximately two hundred twenty-five pounds per square inch and approximately three hundred seventy-five pounds per square inch, or between approximately two hundred fifty pounds per square inch and approximately three hundred fifty pounds per square inch, or between approximately two hundred seventy-five pounds per square inch and approximately three hundred twenty-five pounds per square inch, or between approximately two hundred fifty pounds per square inch and approximately three hundred pounds per square inch, or between approximately three hundred pounds per square inch and approximately three hundred fifty pounds per square inch, or any other range falling within or encompassing the ranges specifically disclosed herein. Accordingly, other sealing forces are embraced by alternate embodiments of the invention.

Because of the high forces applied by the first and second live-loaded seat assemblies 36, 38 at the elongate gate 34 around the flow path 16, there may be a tendency for upper portions 66 of the extended seat plate 62 to cantilever outward, and the L-shaped brackets 64 serve to prevent unwanted outward motion of the upper portions of the extended seat plates 62. Because the extended seat plates 62 extend upward of the flow path 16, the upper portions 66 of the extended seat plates 62 may serve to maintain the seal around the orifice 50 as the elongate gate 34 is actuated in either direct between the closed and open positions.

This is one example of the ways in which the design of the valve 10 is intended to prevent entry of material (e.g., hydrocarbon products and/or black powder) into the upper bonnet assembly 18 or the lower bonnet assembly 20, even while the valve is being actuated. Other examples of design features reducing or eliminating the entry of material into such portions of the valve 10 include the elongate gate 34 having the upper orifice 50 and the lower solid portion 54. This arrangement of the gate and the accompanying actuation (up to close and down to open) ensures that there is never a path between the flow path 16 and the lower bonnet assembly 20 through which material can flow, so since material cannot or largely cannot enter the lower bonnet assembly 20, the need to clean out the lower bonnet assembly 20 is reduced or eliminated, and the possibility of the gate being obstructed such that it cannot be actuated properly or fully is accordingly also reduced. Another example of a design feature preventing or reducing unwanted flow into the upper bonnet assembly 18 or the lower bonnet assembly 20 is the greatly increased sealing pressure applied by the first and second live-loaded seat assemblies 36, 38.

Figure 9:
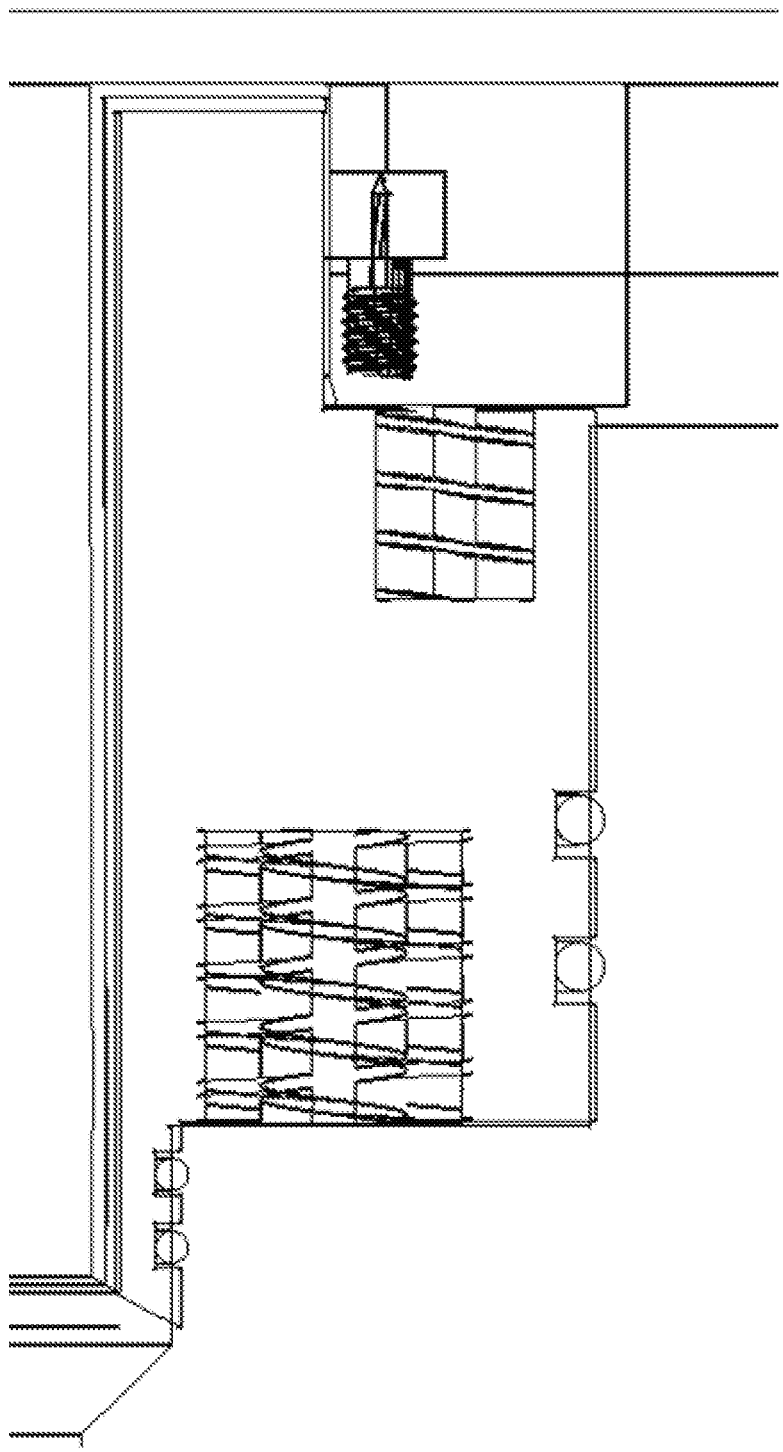
FIG. 9 shows a cross-sectional view of a live-loaded seat assembly at a lower end of a valve opening.
Figure 11:
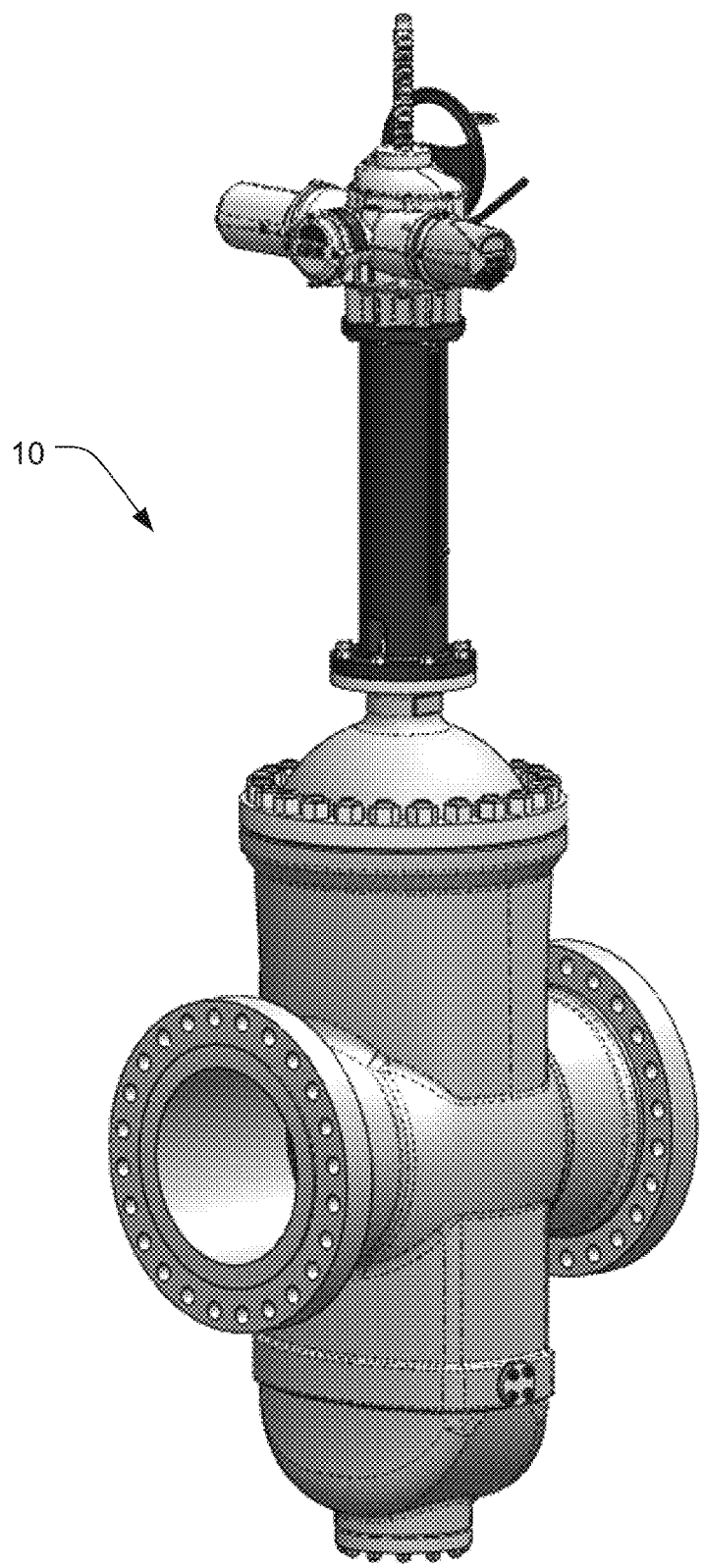
FIG. 11 shows a perspective view of a valve.
Figure 12:
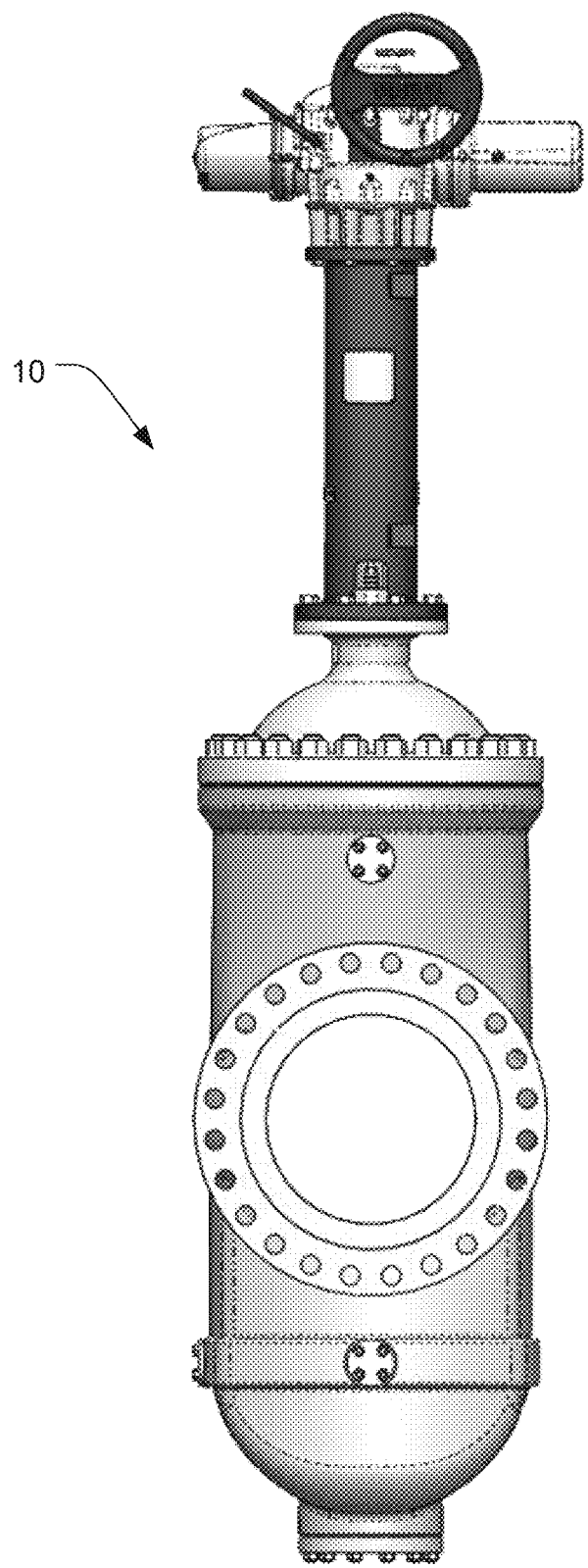
FIG. 12 shows a perspective view of a valve along the flow path.
Figure 13:
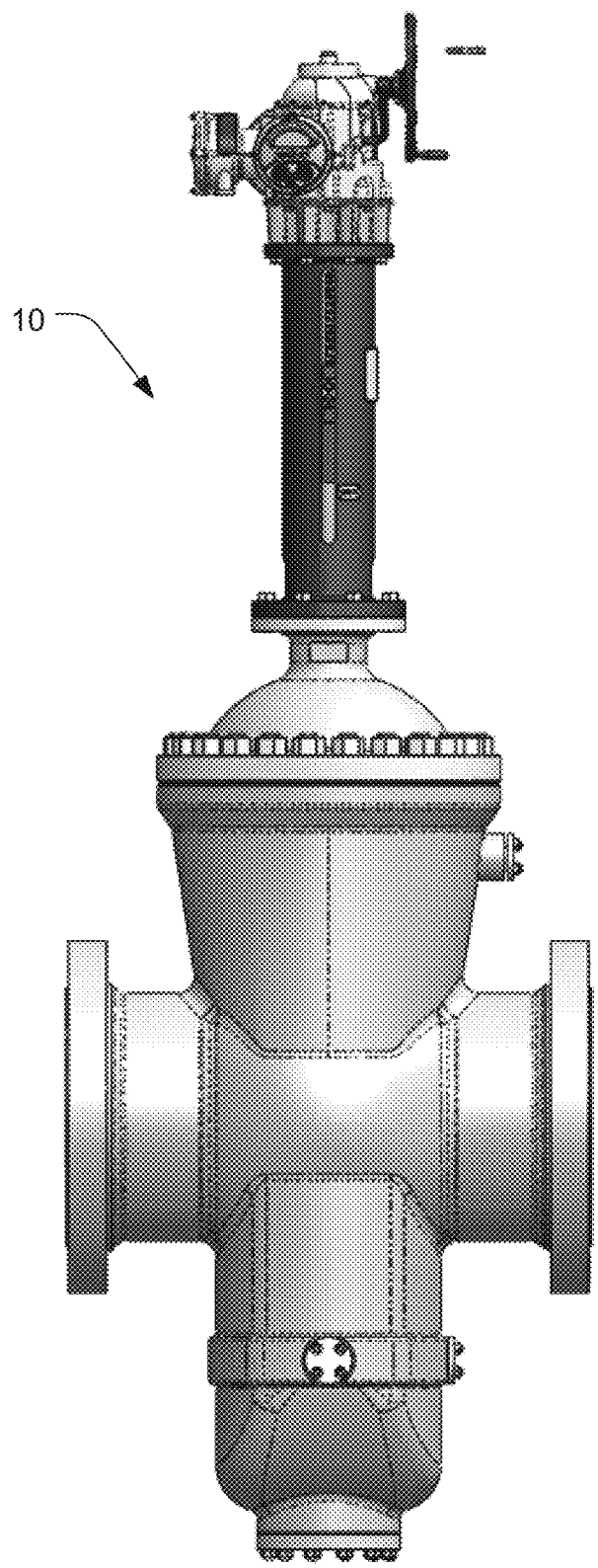
FIG. 13 shows a side view of a valve.
Figure 14:
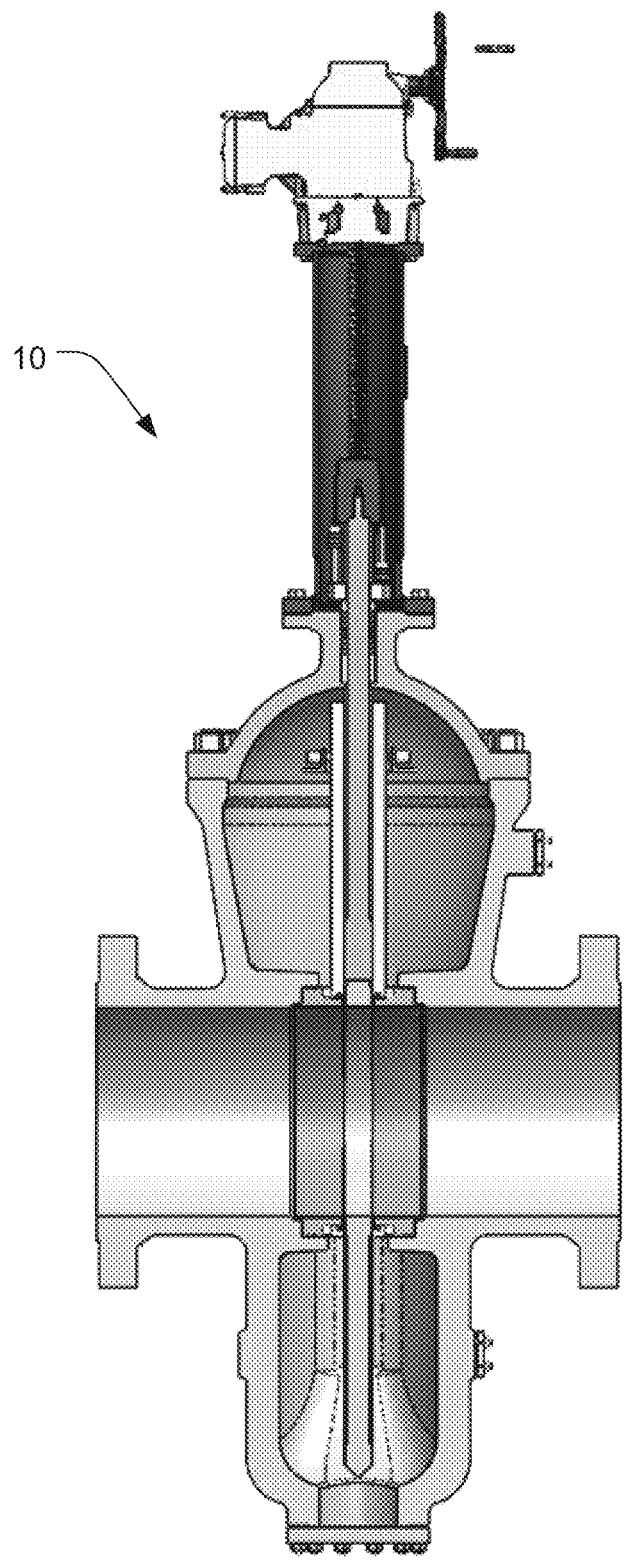
FIG. 14 shows a side cross-sectional view of a valve.

FIGS. 8-10 illustrate the manner in which the pressure is applied between the first and second live-loaded seat assemblies 36, 38 and the elongate gate 34, and also illustrate further design elements of the first and second live-loaded seat assemblies 36, 38 that further serve to reduce or prevent unwanted passage of materials past the first and second live-loaded seat assemblies 36, 38. FIG. 8 provides an exploded view of one of the live-loaded seat assemblies 36, 38. FIG. 9 provides a cross-sectional view of one of the live-loaded seat assemblies 36, 38 at a lower edge of the flow path 16. FIG. 10 provides a cross-sectional view of a matched pair of the first and second live-loaded seat assemblies 36, 38 at an upper edge of the flow path 16.

Each live-loaded seat assembly 36, 38 incorporates the extended seat plate 62 discussed above. On either side of the extended seat plate 62 a gate guide 68 is attached that serves to keep the elongate gate 34 centered so it can be fully opened and closed as desired.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A valve having resistance to black powder wear and damage, comprising:
   a valve body adapted for connection in an oil or gas pipeline and defining a flow passage therethrough;
   an upper bonnet assembly attached to the valve body and defining a stem opening;
   a stem passing through the stem opening; and
   an elongate gate comprising:
     a proximal end operatively attached to the stem;
     a distal end;
     an orifice sized and adapted to permit essentially unopposed passage of material through the gate when the orifice is aligned with the flow passage of the valve body, the orifice being located proximate the proximate end of the gate;
     a solid portion sized and adapted to substantially completely block the flow of material through the gate when the solid portion is aligned with the flow passage of the valve body, the solid portion being located distally of the orifice such that the orifice is located between the proximal end and the solid portion;
   a first live-loaded seat assembly extending between the body and the elongate gate on a first side of the elongate gate;
   a second live-loaded seat assembly extending between the body and the elongate gate on a second side of the elongate gate;
   an extended seat plate encircling the flow passage adjacent the gate and extending upward into the upper bonnet;
   a seat extension encircling the flow passage adjacent the gate and extending between the extended seat plate and the gate in a circumferential notch of the extended seat plate;
   a live-loaded seat encircling the flow passage adjacent the gate and comprising:
     an inner portion extending between the valve body and the gate concentrically inward of the extended seat plate; and
     an outer portion extending between the valve body and the extended seat plate;
   a first plurality of loading assemblies providing a load between the valve body and the live-loaded seat; and
   a second plurality of loading assemblies providing a load between the live-loaded seat and the extended seat plate.

2. The valve as recited in claim 1, wherein the seat extension is formed from glass-filled nylon and creates a sealing surface against the gate.

3. The valve as recited in claim 1, wherein a sealing surface of the first and second live-loaded seat assemblies comprises a hardened and toughened surface.

4. The valve as recited in claim 3, wherein a sealing surface of the first and second live-loaded seat assemblies comprises flame-sprayed nylon.

5. The valve as recited in claim 1, wherein surfaces of the first and second live-loaded seat assemblies exposed to the flow passage, other than sealing surfaces of the first and second live-loaded seat assemblies, comprise a polyurea surface treatment.

6. The valve as recited in claim 5, wherein the polyurea surface treatment is a spray-on surface treatment.

7. The valve as recited in claim 1, wherein the first and second live-loaded seat assemblies provide a sealing force of between two hundred fifty and three hundred fifty pounds per square inch on the gate.

8. The valve as recited in claim 7, wherein the first and second live-loaded seat assemblies provide a sealing force of approximately three hundred pounds per square inch on the gate.

9. The valve as recited in claim 1, wherein the solid portion of the gate comprises a machined recess having a polytetrafluoroethylene (PTFE) surface treatment.

10. The valve as recited in claim 1, wherein the stem is operatively connected to an electric planetary roller screw actuator attached to the upper bonnet assembly.

* * * * *